United States Patent
Minami et al.

(10) Patent No.: US 10,316,158 B2
(45) Date of Patent: *Jun. 11, 2019

(54) PRODUCTION METHOD FOR FIBRE-REINFORCED COMPOSITE MATERIAL, PREPREG, PARTICLE-CONTAINING RESIN COMPOSITION, AND FIBRE-REINFORCED COMPOSITE MATERIAL

(71) Applicants: JXTG NIPPON OIL & ENERGY CORPORATION, Tokyo (JP); SUBARU CORPORATION, Tokyo (JP)

(72) Inventors: Masaki Minami, Tokyo (JP); Takayuki Matsumoto, Tokyo (JP); Yoshihiro Fukuda, Tokyo (JP); Naoyuki Sekine, Tokyo (JP); Masanori Nakajima, Tokyo (JP)

(73) Assignees: JXTG NIPPON OIL & ENERGY CORPORATION, Tokyo (JP); SUBARU CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/037,557

(22) PCT Filed: Oct. 28, 2014

(86) PCT No.: PCT/JP2014/078593
§ 371 (c)(1),
(2) Date: May 18, 2016

(87) PCT Pub. No.: WO2015/076070
PCT Pub. Date: May 28, 2015

(65) Prior Publication Data
US 2016/0297942 A1    Oct. 13, 2016

(30) Foreign Application Priority Data
Nov. 19, 2013   (JP) .................................. 2013-238897

(51) Int. Cl.
*C08J 5/24* (2006.01)
*B29B 11/16* (2006.01)
(Continued)

(52) U.S. Cl.
CPC .................. *C08J 5/24* (2013.01); *B29B 11/16* (2013.01); *B32B 27/12* (2013.01); *B32B 27/20* (2013.01);
(Continued)

(58) Field of Classification Search
CPC ...... B32B 2063/0264; B32B 2260/021; B32B 2264/0264; B32B 27/12; B32B 11/16;
(Continued)

(56) References Cited

U.S. PATENT DOCUMENTS

2011/0294387 A1* 12/2011 Simmons ................ B32B 5/022
  442/376
2012/0141763 A1*  6/2012 Cawse ...................... B32B 5/26
  428/292.1
(Continued)

FOREIGN PATENT DOCUMENTS

CN   101679606 A    3/2010
EP     2540755 A    1/2013
(Continued)

OTHER PUBLICATIONS

Nylon 6, Wikipedia, accessed online Dec. 8, 2017.*
(Continued)

*Primary Examiner* — Camie S Thompson
(74) *Attorney, Agent, or Firm* — Greenblum & Bernstein, P.L.C.

(57) ABSTRACT

A production method for a fiber-reinforced composite material comprises: a step of stacking a prepreg plurally to obtain a prepreg-stacked body; and a step of heating the prepreg-stacked body to cure a resin, wherein the prepreg comprises: a reinforcing fiber layer including reinforcing fibers and a resin composition with which the space between fibers of the reinforcing fibers is impregnated and which contains (A) a benzoxazine resin, (B) an epoxy resin, and (C) a curing agent having 2 or more phenolic hydroxy groups in a molecule; and a surface layer provided on at least one surface of the reinforcing fiber layer and containing (A) to (C) components, and (D) polyamide resin particles having an average particle size of 5 to 50 μm.

14 Claims, 9 Drawing Sheets

(51) Int. Cl.
| | |
|---|---|
| *B32B 27/12* | (2006.01) |
| *C08L 79/06* | (2006.01) |
| *B32B 27/20* | (2006.01) |
| *B29K 63/00* | (2006.01) |
| *B29K 77/00* | (2006.01) |
| *B29K 105/08* | (2006.01) |
| *B29K 307/04* | (2006.01) |

(52) U.S. Cl.
CPC .......... *C08L 79/06* (2013.01); *B29K 2063/00* (2013.01); *B29K 2077/00* (2013.01); *B29K 2105/0872* (2013.01); *B29K 2307/04* (2013.01); *B32B 2260/021* (2013.01); *B32B 2260/046* (2013.01); *B32B 2264/0264* (2013.01); *B32B 2307/306* (2013.01); *B32B 2307/558* (2013.01); *B32B 2307/7265* (2013.01); *B32B 2605/00* (2013.01); *C08J 2379/04* (2013.01); *C08J 2379/06* (2013.01); *C08J 2463/00* (2013.01); *C08J 2477/02* (2013.01); *C08J 2477/06* (2013.01)

(58) Field of Classification Search
CPC ......... B32B 2605/00; B32B 7/12; B32B 7/20; B32B 2260/046; B32B 2307/306; B32B 2307/558; B32B 2307/7265; B32B 27/00; B29K 2063/00; B29K 2105/0872; B29K 2307/04; B29K 2603/00; B29K 2077/00; C08J 5/24; C08J 2463/00; C08J 2477/02; C08J 2477/06; C08L 63/00; C08L 77/00; C08L 2205/03; C08L 79/06; B29C 70/00; C08G 59/38; Y10T 428/24994; Y10T 428/31511; B29B 11/16; C08K 5/24
USPC ........................................................ 428/292.1
See application file for complete search history.

(56) References Cited

U.S. PATENT DOCUMENTS

| | | | |
|---|---|---|---|
| 2015/0056882 | A1 | 2/2015 | Fukuda et al. |
| 2016/0289405 | A1* | 10/2016 | Minami ..................... C08J 5/24 |

FOREIGN PATENT DOCUMENTS

| | | |
|---|---|---|
| JP | 2007-016121 A | 1/2007 |
| JP | 2010-013636 A | 1/2010 |
| JP | 2010-525101 A | 7/2010 |
| JP | 2013-166854 A | 8/2013 |
| JP | 2013-166855 A | 8/2013 |
| WO | 2008/130484 A1 | 10/2008 |
| WO | 2013/122033 A | 8/2013 |

OTHER PUBLICATIONS

Nylon 12, Wikipedia, accessed online Dec. 8, 2017.*
Wikipedia: Polyamide 12, accessed online Jun. 16, 2018.*
DuPont Performance Polymers: Polyamide 1010, accessed online Jun. 16, 2018.*
International Search Report and Written Opinion issued with respect to Application No. PCT/JP2014/078593, dated Jan. 20, 2015.
International Preliminary Report on Patentability issued with respect to Application No. PCT/JP2014/078593, dated Jun. 2, 2016.
Extended European Search Report in respect to European Application No. 14863747.3, dated Jun. 30, 2017, 10 pages.
Chinese Office Action issued with respect to CN Patent Application No. 201480063138.4, dated Feb. 5, 2018.

* cited by examiner (a)

(b)

(a)

(b)

(c)

PRODUCTION METHOD FOR FIBRE-REINFORCED COMPOSITE MATERIAL, PREPREG, PARTICLE-CONTAINING RESIN COMPOSITION, AND FIBRE-REINFORCED COMPOSITE MATERIAL

TECHNICAL FIELD

The present invention relates to a production method for a fiber-reinforced composite material, and a prepreg and a resin composition containing particles which can be used for it, and a fiber-reinforced composite material. The present invention particularly relates to a production method for a fiber-reinforced composite material for aircraft uses, vessel uses, automobile uses, sports uses, and other general industrial uses, and a prepreg and a resin composition containing particles which can be used for it, and a fiber-reinforced composite material.

BACKGROUND ART

Fiber-reinforced composite materials made of various fibers and matrix resins are widely used for aircraft, vessels, automobiles, sports equipment, other general industrial uses, etc. because of their excellent mechanical properties. In recent years, with actual uses of them, the range of use of fiber-reinforced composite materials has been becoming wider and wider.

As such fiber-reinforced composite materials, ones using a benzoxazine resin are proposed in, for example, Patent Literatures 1 and 2. The benzoxazine resin has excellent moisture resistance and heat resistance, but has the problem of being inferior in toughness; and measures in which epoxy resins, various resin fine particles, etc. are blended to make up for the disadvantage are taken.

CITATION LIST

Patent Literature

Patent Literature 1: Japanese Unexamined Patent Publication Laid-Open No. 2007-16121
Patent Literature 2: Japanese Unexamined Patent Publication No. 2010-13636

SUMMARY OF INVENTION

Technical Problem

For fiber-reinforced composite materials for aircraft uses, further weight reduction is desired. To reduce the weight of the material, it is necessary to achieve, in particular, a compressive strength after impact (hereinafter, abbreviated as a CAI) and a flexural modulus out of the mechanical characteristics needed for aircraft uses at high level at the same time, and it is also necessary for the glass transition temperature of the resin material used to be kept high in order to maintain high temperature characteristics. Further, it is also one of important characteristics of a fiber-reinforced composite material, which is typically formed by stacking a prepreg plurally and heating the prepregs, that peeling between the fiber layers is less likely to occur. However, it cannot necessarily be said that these can be achieved at high level at the same time in the examples specifically described in Patent Literatures above.

An object of the present invention is to provide a production method for a fiber-reinforced composite material that makes it possible to obtain a fiber-reinforced composite material that, while using a benzoxazine resin having excellent moisture resistance and heat resistance, can achieve interlaminar fracture toughness, CAI, and flexural modulus at high level at the same time and can also keep the glass transition temperature of the resin material high, and a prepreg and a resin composition containing particles which can be used for it, and a fiber-reinforced composite material.

Solution to Problem

To solve the problem mentioned above, the present invention provides a production method for a fiber-reinforced composite material comprising: a step of stacking a prepreg plurally and heating the prepregs to cure a resin, wherein the prepreg comprises: a reinforcing fiber layer including reinforcing fibers and a resin composition with which the space between fibers of the reinforcing fibers is impregnated and which contains (A) a benzoxazine resin, (B) an epoxy resin, and (C) a curing agent having 2 or more phenolic hydroxy groups in a molecule; and a surface layer provided on at least one surface of the reinforcing fiber layer and containing (A) a benzoxazine resin, (B) an epoxy resin, (C) a curing agent having 2 or more phenolic hydroxy groups in a molecule, and (D) polyamide resin particles having an average particle size of 5 to 50 μm, wherein the polyamide resin particles include (D1) a first polyamide resin particle and (D2) a second polyamide resin particle having a higher melting temperature measured in a composition constituting the surface layer than the first polyamide resin particle has.

By the production method for a fiber-reinforced composite material of the present invention, a fiber-reinforced composite material that, while using a benzoxazine resin having excellent moisture resistance and heat resistance, can achieve interlaminar fracture toughness, CAI, and flexural modulus at high level at the same time and can also keep the glass transition temperature of the resin material high can be obtained.

The present inventors presume the reason why the interlaminar fracture toughness, the CAI, and the flexural modulus can be improved by the method mentioned above as follows. A decrease in the melting temperature of the polyamide resin particles occurs due to the presence of the compound having phenolic hydroxy groups that is the curing agent of the benzoxazine resin. Here, if the melting temperature of the polyamide resin particles is too low, during the curing of the thermosetting resin in preparing a fiber-reinforced composite material using the prepreg, the polyamide resin particles are likely to melt and the melted polyamide resin particles are likely to enter the reinforcing fiber layer. The reason is considered that, by using two types of the polyamide resin particles mentioned above having different melting temperatures, one polyamide resin particle can be melted moderately while the other polyamide resin particle is kept in a state where it is difficult for the polyamide resin particle to flow under temperature conditions for sufficiently curing the (A) to (C) components mentioned above, and as a result a resin cured layer excellent in adhesiveness, peel resistance, and flexural modulus has been formed between the fiber layers.

According to research by the present inventors, it has been revealed that a prepreg obtained by using one type of polyamide resin particles may have influence on evaluation results of CAI, mode I interlaminar fracture toughness (G1c), mode II interlaminar fracture toughness (G2c), or the like depending on temperature increase conditions in heating a stacked body thereof. By the production method for a fiber-reinforced composite material of the present invention, such variation in physical properties due to the difference in heating conditions can be suppressed, and interlaminar fracture toughness and CAI at high level can be obtained stably.

In the production method for a fiber-reinforced composite material of the present invention, it is preferable that the melting temperature of the (D1) first polyamide resin particles mentioned above measured in a composition constituting the surface layer mentioned above be 120 to 170° C. and the melting temperature of the (D2) second polyamide resin particles mentioned above measured in a composition constituting the surface layer mentioned above be 175 to 220° C.

When it is assumed that the melting temperature of the (D1) first polyamide resin particles mentioned above measured in the composition constituting the surface layer mentioned above is $M_1$° C. and the melting temperature of the (D2) second polyamide resin particles mentioned above measured in the composition constituting the surface layer mentioned above is $M_2$° C., it is preferable that the value of $(M_2-M_1)$ be 5 or more.

It is preferable that the surface layer mentioned above contain 65 to 78 parts by mass of the (A) component mentioned above, 22 to 35 parts by mass of the (B) component mentioned above, 5 to 20 parts by mass of the (C) component mentioned above, and 15 to 45 parts by mass of the (D) component mentioned above when it is assumed that the total amount of the (A) component mentioned above and the (B) component mentioned above is 100 parts by mass. By setting the amount of each of the components contained in the surface layer in the range mentioned above, each melting temperature of the first polyamide resin particles and the second polyamide resin particles in the surface layer can be in a moderate range; a moderate melting can be generated while sufficiently suppressing the first polyamide resin particles having a lower melting temperature entering the reinforcing fiber layer; and the interlaminar fracture toughness, CAI, and flexural modulus can be more improved.

The fiber-reinforced composite material obtained by the method of the present invention has excellent moisture resistance and heat resistance and can achieve interlaminar fracture toughness, CAI, and flexural modulus at high level at the same time. By the fiber-reinforced composite material obtained by the present invention, the weight of the material can be reduced through the excellent physical properties mentioned above.

The present invention also provides a prepreg comprising: a reinforcing fiber layer including reinforcing fibers and a resin composition with which the space between fibers of the reinforcing fibers is impregnated and which contains (A) a benzoxazine resin, (B) an epoxy resin, and (C) a curing agent having 2 or more phenolic hydroxy groups in a molecule; and a surface layer provided on at least one surface of the reinforcing fiber layer and containing (A) a benzoxazine resin, (B) an epoxy resin, (C) a curing agent having 2 or more phenolic hydroxy groups in a molecule, and (D) polyamide resin particles having an average particle size of 5 to 50 μm, wherein the polyamide resin particles include (D1) a first polyamide resin particle and (D2) a second polyamide resin particle having a higher melting temperature measured in a composition constituting the surface layer than the first polyamide resin particle has.

By the prepreg of the present invention being stacked plurally and heated to cure the resin, the fiber-reinforced composite material according to the present invention described above can be obtained.

In the prepreg of the present invention, it is preferable that the melting temperature of the (D1) first polyamide resin particles mentioned above measured in the composition constituting the surface layer mentioned above be 120 to 170° C. and the melting temperature of the (D2) second polyamide resin particles mentioned above measured in the composition constituting the surface layer mentioned above be 175 to 220° C.

When it is assumed that the melting temperature of the (D1) first polyamide resin particles mentioned above measured in the composition constituting the surface layer mentioned above is $M_1$° C. and the melting temperature of the (D2) second polyamide resin particles mentioned above measured in the composition constituting the surface layer mentioned above is $M_2$° C., it is preferable that the value of $(M_2-M_1)$ be 5 or more.

Further, it is preferable that the surface layer mentioned above contain 65 to 78 parts by mass of the (A) component mentioned above, 22 to 35 parts by mass of the (B) component mentioned above, 5 to 20 parts by mass of the (C) component mentioned above, and 15 to 45 parts by mass of the (D) component mentioned above when it is assumed that the total amount of the (A) component mentioned above and the (B) component mentioned above is 100 parts by mass.

The present invention also provides a resin composition containing particles, comprising (A) a benzoxazine resin, (B) an epoxy resin, (C) a curing agent having 2 or more phenolic hydroxy groups in a molecule, and (D) polyamide resin particles having an average particle size of 5 to 50 μm, wherein the polyamide resin particles include (D1) a first polyamide resin particle and (D2) a second polyamide resin particle having a higher melting temperature measured in the composition than the first polyamide resin particle has.

By the resin composition containing particles according to the present invention, the prepreg according to the present invention described above and the fiber-reinforced composite material according to the present invention can be obtained.

In the resin composition containing particles according to the present invention, it is preferable that the melting temperature of the (D1) first polyamide resin particles mentioned above measured in the resin composition containing particles be 120 to 170° C. and the melting temperature of the (D2) second polyamide resin particles mentioned above measured in the resin composition containing particles be 175 to 220° C.

When it is assumed that the melting temperature of the (D1) first polyamide resin particles mentioned above measured in the resin composition containing particles is $M_1$° C. and the melting temperature of the (D2) second polyamide resin particles mentioned above measured in the resin composition containing particles is $M_2$° C., it is preferable that the value of $(M_2-M_1)$ be 5 or more.

Further, it is preferable that the resin composition containing particles according to the present invention contain 65 to 78 parts by mass of the (A) component mentioned above, 22 to 35 parts by mass of the (B) component mentioned above, 5 to 20 parts by mass of the (C) component mentioned above, and 15 to 45 parts by mass of the (D) component mentioned above when it is assumed that the total amount of the (A) component mentioned above and the (B) component mentioned above is 100 parts by mass.

The present invention also provides a fiber-reinforced composite material obtained by stacking the prepreg according to the present invention mentioned above plurally and performing heating under increased pressure.

By being obtained from the prepreg according to the present invention, the fiber-reinforced composite material of the present invention has excellent moisture resistance and heat resistance and can achieve interlaminar fracture toughness, CM and flexural modulus at high level at the same time. By the fiber-reinforced composite material of the present invention, the weight of the material can be reduced through the excellent physical properties mentioned above.

Advantageous Effects of Invention

According to the present invention, a production method for a fiber-reinforced composite material that makes it possible to obtain a fiber-reinforced composite material that, while using a benzoxazine resin having excellent moisture resistance and heat resistance, can achieve interlaminar fracture toughness, CAI, and flexural modulus at high level at the same time and can also keep the glass transition temperature of the resin material high, and a prepreg and a resin composition containing particles which can be used for it, and a fiber-reinforced composite material can be provided. By the production method for a fiber-reinforced composite material, and the prepreg and the resin composition containing particles which can be used for it, and the fiber-reinforced composite material of the present invention, variation in physical properties due to the difference in heating conditions can be suppressed.

The fiber-reinforced composite material obtained by the method of the present invention can be suitably used for aircraft uses, vessel uses, automobile uses, sports uses, and other general industrial uses, and is useful particularly for aircraft uses.

DESCRIPTION OF EMBODIMENTS

Suitable embodiments of the present invention will now be described in detail.

The production method for a fiber-reinforced composite material according to the embodiment comprises: a step of stacking a prepreg plurally to obtain a prepreg-stacked body; and a step of heating the prepreg-stacked body to cure a resin, wherein the prepreg comprises: a reinforcing fiber layer including reinforcing fibers and a resin composition with which the space between fibers of the reinforcing fibers is impregnated and which contains (A) a benzoxazine resin, (B) an epoxy resin, and (C) a curing agent having 2 or more phenolic hydroxy groups in a molecule; and a surface layer provided on at least one surface of the reinforcing fiber layer and containing (A) a benzoxazine resin, (B) an epoxy resin, (C) a curing agent having 2 or more phenolic hydroxy groups in a molecule, and (D) polyamide resin particles having an average particle size of 5 to 50 μm, wherein the polyamide resin particles include (D1) a first polyamide resin particle and (D2) a second polyamide resin particle having a higher melting temperature measured in a composition constituting the surface layer than the first polyamide resin particle has.

In the present specification, the melting point of the polyamide resin particles is defined as a value determined by increasing the polyamide resin particles in temperature at a rate of 10° C./minute from 25° C. using a differential scanning calorimeter (DSC), and measuring the temperature of the top of the resulting endothermic peak. The melting temperature of the polyamide resin particles measured in the composition constituting the surface layer refers to a temperature of the top of an endothermic peak obtained by increasing the composition constituting the surface layer containing the polyamide resin particles in temperature at a rate of 10° C./minute from 25° C. using a differential scanning calorimeter (DSC).

In the embodiment, the step mentioned above may include a step of measuring the melting temperature of the polyamide resin particles in the composition constituting the surface layer and a step of stacking the prepreg mentioned above plurally and heating the prepregs to cure the resin, or heating to cure the resin may be performed on the basis of the melting temperature of the polyamide resin particles in the composition constituting the surface layer which has been measured in advance.

Figure 1:
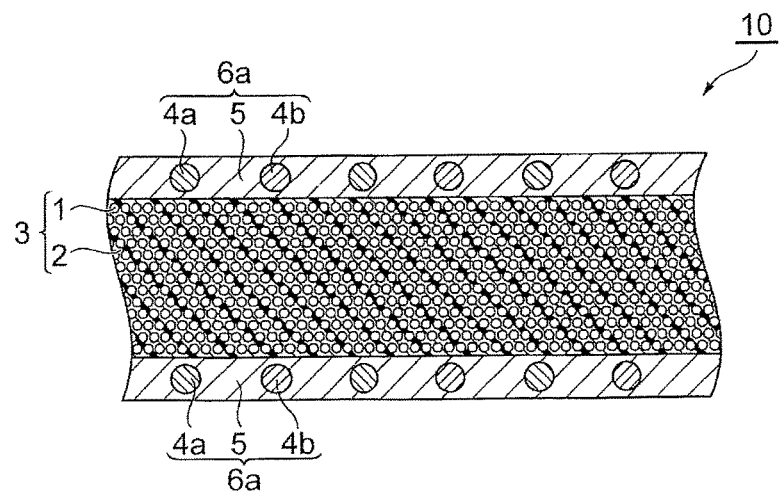
FIG. 1 is schematic cross-sectional views for describing prepregs.
Figure 1:
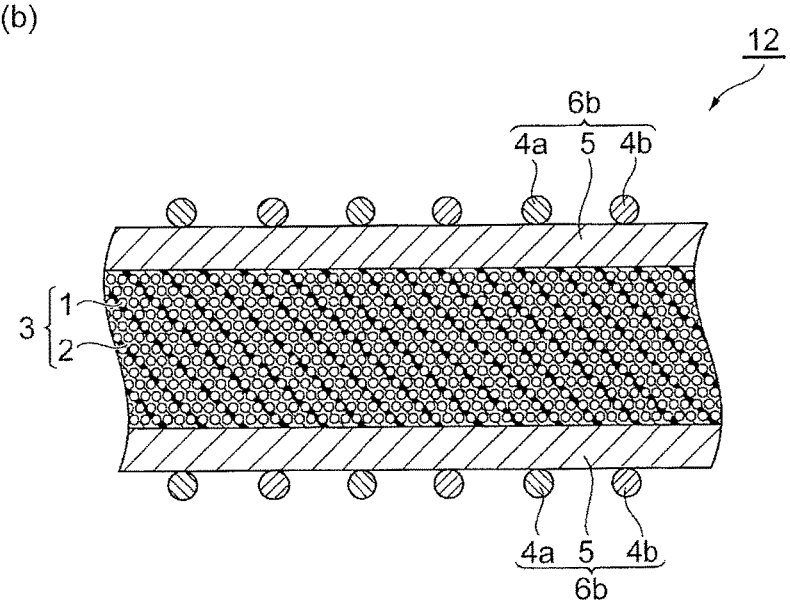

FIG. 1 is schematic cross-sectional views for describing a prepreg used in the embodiment. A prepreg 10 shown in (a) of FIG. 1 comprises: a reinforcing fiber layer 3 including reinforcing fibers 1 and a resin composition 2 with which the space between fibers of the reinforcing fibers 1 is impregnated; and a surface layer 6a provided on a surface of the reinforcing fiber layer 3 and containing first polyamide resin particles 4a, second polyamide resin particles 4b, and a resin composition 5. In the surface layer 6a of the prepreg 10, the first polyamide resin particles 4a and the second polyamide resin particles 4b are included in the layer of the resin composition 5. A prepreg 12 shown in (b) of FIG. 1 has the same configuration as the prepreg 10 except that it comprises, in place of the surface layer 6a in the prepreg 10, a surface layer 6b in which first polyamide resin particles 4a and second polyamide resin particles 4b are attached to the surface on the opposite side to the reinforcing fiber layer 3 of the layer of the resin composition 5.

In the prepregs 10 and 12 according to the embodiment, the resin composition 2 contains (A) a benzoxazine resin, (B) an epoxy resin, and (C) a curing agent having 2 or more phenolic hydroxy groups in a molecule; the surface layers 6a and 6b each contain (A) a benzoxazine resin, (B) an epoxy resin, (C) a curing agent having 2 or more phenolic hydroxy groups in a molecule, and (D) polyamide resin particles having an average particle size of 5 to 50 μm; and the polyamide resin particles include (D1) a first polyamide resin particle and (D2) a second polyamide resin particle having a higher melting temperature measured in a composition constituting the surface layer, that is, the resin composition 5 than the first polyamide resin particle has.

As (A) the benzoxazine resin used in the embodiment (hereinafter, occasionally referred to as an (A) component), a compound having a benzoxazine ring represented by the following formula (A-1) is given.

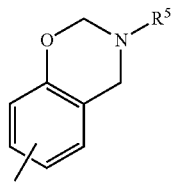

(A-1)

In formula (A-1), $R^5$ represents a linear alkyl group having 1 to 12 carbon atoms, a cyclic alkyl group having 3 to 8 carbon atoms, an aryl group having 6 to 14 carbon atoms, or an aryl group substituted with a linear alkyl group having 1 to 12 carbon atoms or a halogen. A hydrogen atom may be bonded to the bond.

Examples of the linear alkyl group having 1 to 12 carbon atoms include a methyl group, an ethyl group, a propyl group, an isopropyl group, a n-butyl group, an isobutyl group, and a t-butyl group. Examples of the cyclic alkyl group having 3 to 8 carbon atoms include a cyclopentyl group and a cyclohexyl group. Examples of the aryl group having 6 to 14 carbon atoms include a phenyl group, a 1-naphthyl group, a 2-naphthyl group, a phenanthryl group, and a biphenyl group. Examples of the aryl group substituted with a linear alkyl group having 1 to 12 carbon atoms or a halogen include an o-tolyl group, a m-tolyl group, a p-tolyl group, a xylyl group, an o-ethylphenyl group, a m-ethylphenyl group, a p-ethylphenyl group, an o-t-butylphenyl group, a m-t-butylphenyl group, a p-t-butylphenyl group, an o-chlorophenyl group, and an o-bromophenyl group.

As $R^5$, of the examples mentioned above, a methyl group, an ethyl group, a propyl group, a phenyl group, and an o-methylphenyl group are preferable because of providing good handleability.

Furthermore, as (A) the benzoxazine resin, a compound having benzoxazine rings represented by the following formula (A-2) is given.

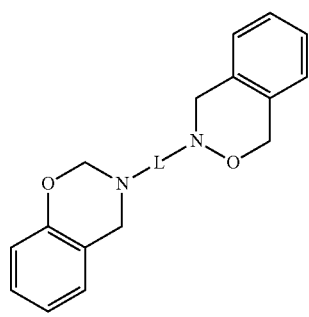

(A-2)

In formula (A-2), L represents an alkylene group or an arylene group.

Preferred examples of the benzoxazine resin of the (A) component include the monomers represented by the following formulae, oligomers in which several molecules of the monomers are polymerized, and reaction products of at least one of the monomers represented by the following formulae and a compound having a benzoxazine ring having a structure different from these monomers.

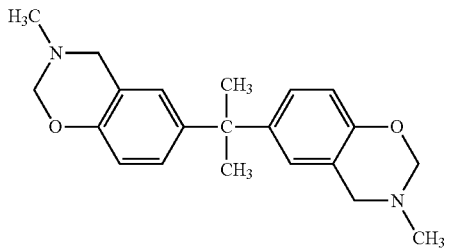

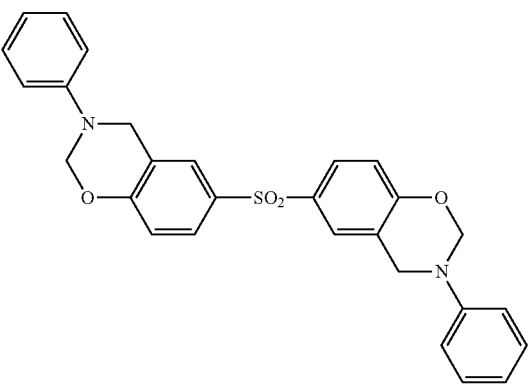

-continued

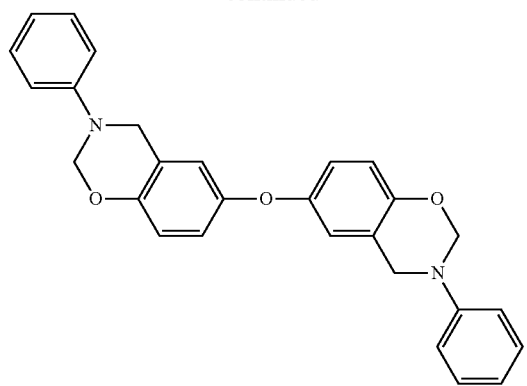

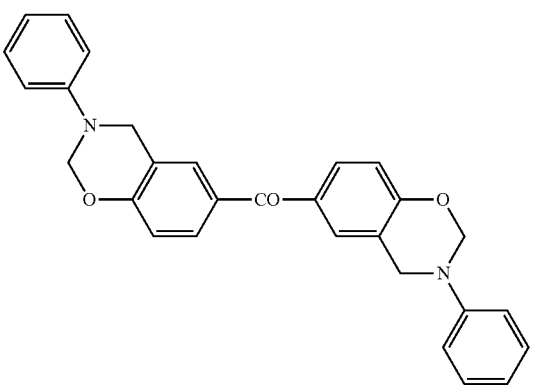

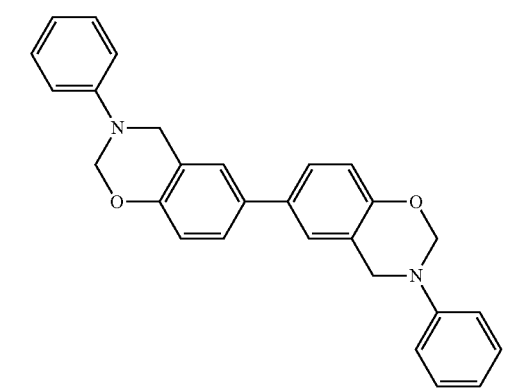

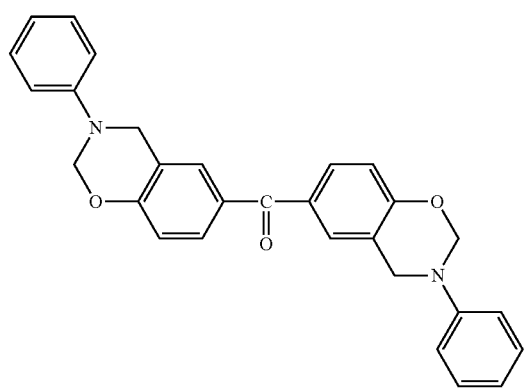

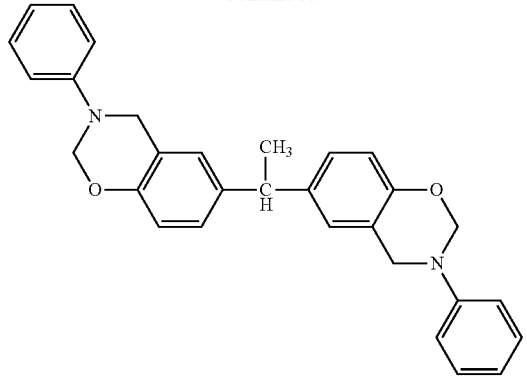

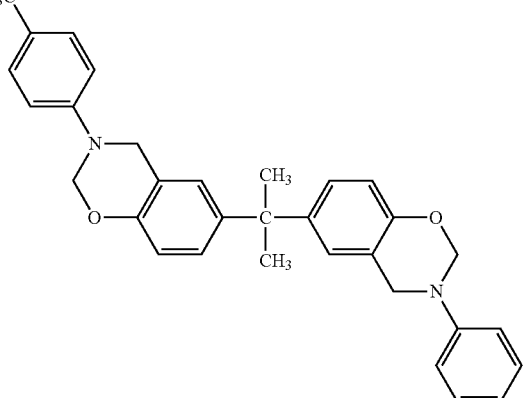

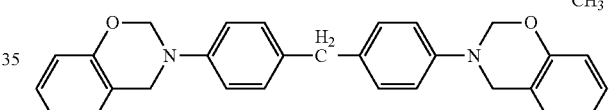

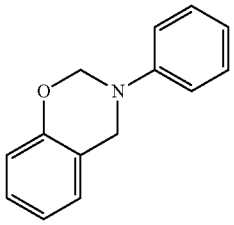

The (A) component forms a skeleton similar to phenol resins by the benzoxazine ring polymerizing by ring-opening, and is therefore excellent in fire retardancy. Furthermore, excellent mechanical characteristics such as a low percentage of water absorption and a high elastic modulus are obtained because of its dense structure.

The (A) component may be used singly or in combinations of two or more.

(B) the epoxy resin (hereinafter, occasionally referred to as a (B) component) used in the embodiment controls the viscosity of the composition, and is blended as a component that enhances the curability of the composition. Preferred examples of the (B) component include epoxy resins produced using a compound such as amines, phenols, carboxylic acids, and compounds having a carbon-carbon double bond as a precursor.

Examples of the epoxy resins produced using amines as a precursor include tetraglycidyldiaminodiphenylmethane, glycidyl compounds of xylenediamine, triglycidylaminophenol, and glycidylaniline, and regioisomers of each thereof and alkyl group- or halogen-substituted products thereof. Hereinafter, when commercially available products are given as examples, for liquid products, the complex viscoelastic modulus η* at 25° C. obtained with a dynamic viscoelasticity measurement apparatus described later is written as the viscosity.

Examples of the commercially available products of tetraglycidyldiaminodiphenylmethane include "SUMI-EP-DXY" (registered trademark, the same applies hereinafter) ELM 434 (manufactured by Sumitomo Chemical Company, Limited), "Araldite" (registered trademark, the same applies hereinafter) MY 720, "Araldite" MY 721, "Araldite" MY 9512, "Araldite" MY 9612, "Araldite" MY 9634, and "Araldite" MY 9663 (all manufactured by Huntsman Advanced Materials), and "jER" (registered trademark, the same applies hereinafter) 604 (manufactured by Mitsubishi Chemical Corporation).

Examples of the commercially available products of triglycidylaminophenol include "jER" 630 (viscosity: 750 mPa·s) (manufactured by Mitsubishi Chemical Corporation), "Araldite" MY 0500 (viscosity: 3500 mPa·s) and MY 0510 (viscosity: 600 mPa·s) (both manufactured by Huntsman Advanced Materials), and ELM 100 (viscosity: 16000 mPa·s) (manufactured by Sumitomo Chemical Company, Limited).

Examples of the commercially available products of glycidylanilines include GAN (viscosity: 120 mPa·s) and GOT (viscosity: 60 mPa·s) (both manufactured by Nippon Kayaku Co., Ltd.).

Examples of the glycidyl ether-type epoxy resins produced using phenols as a precursor include bisphenol A-type epoxy resins, bisphenol F-type epoxy resins, bisphenol S-type epoxy resins, epoxy resins having a biphenyl skeleton, phenol novolac-type epoxy resins, cresol novolac-type epoxy resins, resorcinol-type epoxy resins, epoxy resins having a naphthalene skeleton, trisphenylmethane-type epoxy resins, phenolaralkyl-type epoxy resins, dicyclopentadiene-type epoxy resins, and diphenylfluorene-type epoxy resins, and various isomers of each thereof and alkyl group- or halogen-substituted products thereof. Also epoxy resins obtained by modifying epoxy resins produced using phenols as a precursor with a urethane or an isocyanate are included in this type.

Examples of the commercially available products of liquid bisphenol A-type epoxy resins include "jER" 825 (viscosity: 5000 mPa·s), "jER" 826 (viscosity: 8000 mPa·s), "jER" 827 (viscosity: 10000 mPa·s), and "jER" 828 (viscosity: 13000 mPa·s) (all manufactured by Mitsubishi Chemical Corporation), "EPICLON" (registered trademark, the same applies hereinafter) 850 (viscosity: 13000 mPa·s) (manufactured by DIC Corporation), "Epotohto" (registered trademark, the same applies hereinafter) YD-128 (viscosity: 13000 mPa·s) (manufactured by Nippon Steel Chemical Co., Ltd.), and DER-331 (viscosity: 13000 mPa·s) and DER-332 (viscosity: 5000 mPa·s) (manufactured by The Dow Chemical Company). Examples of the commercially available products of solid or semisolid bisphenol A-type epoxy resins include "jER" 834, "jER" 1001, "jER" 1002, "jER" 1003, "jER" 1004, "jER" 1004AF, "jER" 1007, and "jER" 1009 (all manufactured by Mitsubishi Chemical Corporation).

Examples of the commercially available products of liquid bisphenol F-type epoxy resins include "jER" 806 (viscosity: 2000 mPa·s), "jER" 807 (viscosity: 3500 mPa·s), and "jER" 1750 (viscosity: 1300 mPa·s) (all manufactured by Mitsubishi Chemical Corporation), "EPICLON" 830 (viscosity: 3500 mPa·s) (manufactured by DIC Corporation), and "Epotohto" YD-170 (viscosity: 3500 mPa·s) and "Epotohto" YD-175 (viscosity: 3500 mPa·s) (both manufactured by Nippon Steel Chemical Co., Ltd.). Examples of the commercially available products of solid bisphenol F-type epoxy resins include 4004P, "jER" 4007P, and "jER" 4009P (all manufactured by Mitsubishi Chemical Corporation) and "Epotohto" YDF 2001 and "Epotohto" YDF 2004 (both manufactured by Nippon Steel Chemical Co., Ltd.).

Examples of the commercially available products of bisphenol S-type epoxy resins include EXA-1515 (manufactured by DIC Corporation).

Examples of the commercially available products of epoxy resins having a biphenyl skeleton include "jER" YX4000H, "jER" YX4000, and "jER" YL6616 (all manufactured by Mitsubishi Chemical Corporation) and NC-3000 (manufactured by Nippon Kayaku Co., Ltd.).

Examples of the commercially available products of phenol novolac-type epoxy resins include "jER" 152 and "jER" 154 (both manufactured by Mitsubishi Chemical. Corporation) and "EPICLON" N-740, "EPICLON" N-770, and "EPICLON" N-775 (all manufactured by DIC Corporation).

Examples of the commercially available products of cresol novolac-type epoxy resins include "EPICLON" N-660, "EPICLON" N-665, "EPICLON" N-670, "EPICLON" N-673, and "EPICLON" N-695 (all manufactured by DIC Corporation) and EOCN-1020, EOCN-102S, and EOCN-104S (all manufactured by Nippon Kayaku Co., Ltd.).

Examples of the commercially available products of resorcinol-type epoxy resins include "Denacol" (registered trademark, the same applies hereinafter) EX-201 (viscosity: 250 mPa·s) (manufactured by Nagase ChemteX Corporation).

Examples of the commercially available products of epoxy resins having a naphthalene skeleton include "EPICLON" HP 4032 (manufactured by DIC Corporation) and NC-7000 and NC-7300 (both manufactured by Nippon Kayaku Co., Ltd.).

Examples of the commercially available products of trisphenylmethane-type epoxy resins include TMH-574 (manufactured by Sumitomo Chemical Company, Limited).

Examples of the commercially available products of dicyclopentadiene-type epoxy resins include "EPICLON" HP 7200, "EPICLON" HP 7200L, and "EPICLON" HP 7200H (all manufactured by DIC Corporation), "Tactix" (registered trademark) 558 (manufactured by Huntsman Advanced Materials), and XD-1000-1L and XD-1000-2L (both manufactured by Nippon Kayaku Co., Ltd.).

Examples of the commercially available products of urethane and isocyanate-modified epoxy resins include AER 4152 having an oxazolidone ring (manufactured by Asahi Kasei E-materials Corporation).

Examples of the epoxy resins produced using a carboxylic acid as a precursor include glycidyl compounds of phthalic acid, glycidyl compounds of hexahydrophthalic acid and glycidyl compounds of dimer acids, and various isomers of each of them.

Examples of the commercially available products of phthalic acid diglycidyl esters include "EPOMIK" (registered trademark, the same applies hereinafter) R508 (viscosity: 4000 mPa·s) (manufactured by Mitsui Chemicals, Inc.) and "Denacol" EX-721 (viscosity: 980 mPa·s) (manufactured by Nagase ChemteX Corporation).

Examples of the commercially available products of hexahydrophthalic acid diglycidyl esters include "EPOMIK" R540 (viscosity: 350 mPa·s) (manufactured by Mitsui Chemicals, Inc.) and AK-601 (viscosity: 300 mPa·s) (manufactured by Nippon Kayaku Co., Ltd.).

Examples of the commercially available products of dimer acid diglycidyl esters include "jER" 871 (viscosity: 650 mPa·s) (manufactured by Mitsubishi Chemical Corporation) and "Epotohto" YD-171 (viscosity: 650 mPa·s) (manufactured by Nippon Steel Chemical Co., Ltd.).

Examples of the epoxy resins produced using compounds having a carbon-carbon double bond as a precursor include alicyclic epoxy resins. Examples of the alicyclic epoxy resins include (3',4'-epoxycyclohexane)methyl-3,4-epoxycyclohexanecarboxylate, (3',4'-epoxycyclohexane)octyl-3,4-epoxycyclohexanecarboxylate, and 1-methyl-4-(2-methyloxiranyl)-7-oxabicyclo[4.1.0]heptane.

Examples of the commercially available products of (3',4'-epoxycyclohexane)methyl-3,4-epoxycyclohexanecarboxylate include "CELLOXIDE" (registered trademark, the same applies hereinafter) 2021P (viscosity: 250 mPa·s) (manufactured by Daicel Chemical Industries, Ltd.) and CY 179 (viscosity: 400 mPa·s) (manufactured by Huntsman Advanced Materials); examples of the commercially available products of (3',4'-epoxycyclohexane)octyl-3,4-epoxycyclohexanecarboxylate include "CELLOXIDE" 2081 (viscosity: 100 mPa·s) (manufactured by Daicel Chemical Industries, Ltd.); and examples of the commercially available products of 1-methyl-4-(2-methyloxiranyl)-7-oxabicyclo[4.1.0]heptane include "CELLOXIDE" 3000 (viscosity: 20 mPa·s) (manufactured by Daicel Chemical Industries, Ltd.).

In the embodiment, an epoxy resin that is in a liquid form at 25° C. may be blended from the viewpoints of tackiness and draping properties. It is preferable that the viscosity at 25° C. of the epoxy resin that is in a liquid form at 25° C. be as low as possible from the viewpoints of tackiness and draping properties. Specifically, 5 mPa·s or more, which is the lower limit obtained with commercially available products of epoxy resins, and 20000 mPa·s or less are preferable, and 5 mPa·s or more and 15000 mPa·s or less are more preferable. If the viscosity at 25° C. is more than 20000 mPa·s, tackiness or draping properties may be reduced.

On the other hand, an epoxy resin that is in a solid form at 25° C. may be blended from the viewpoint of heat resistance. As the epoxy resin that is in a solid form at 25° C., epoxy resins having a high aromatic content are preferable; and examples include epoxy resins having a biphenyl skeleton, epoxy resins having a naphthalene skeleton, and phenolaralkyl-type epoxy resins.

The (B) component may be used singly or in combinations of two or more.

As (C) the curing agent having 2 or more phenolic hydroxy groups in a molecule (hereinafter, occasionally referred to as a (C) component) used in the embodiment, polyfunctional phenols such as bisphenols are given; and examples include bisphenol A, bisphenol F, bisphenol S, thiodiphenol, and bisphenols represented by the following formula (C-1).

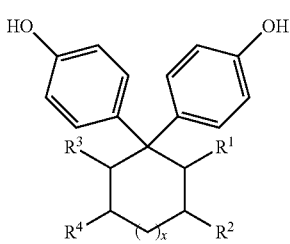

(C-1)

In formula (C-1), $R^1$, $R^2$, $R^3$, and $R^4$ represent a hydrogen atom or a hydrocarbon group; when $R^1$, $R^2$, $R^3$, or $R^4$ is a hydrocarbon group, they are a linear or branched alkyl group having 1 to 4 carbon atoms, or adjacent $R^1$ and $R^2$ or adjacent $R^3$ and $R^4$ bind to form a substituted or unsubstituted aromatic ring having 6 to 10 carbon atoms or a substituted or unsubstituted alicyclic structure having 6 to 10 carbon atoms; and x represents 0 or 1.

Examples of the curing agent represented by the above formula (C-1) include the compounds represented by the following formulae.

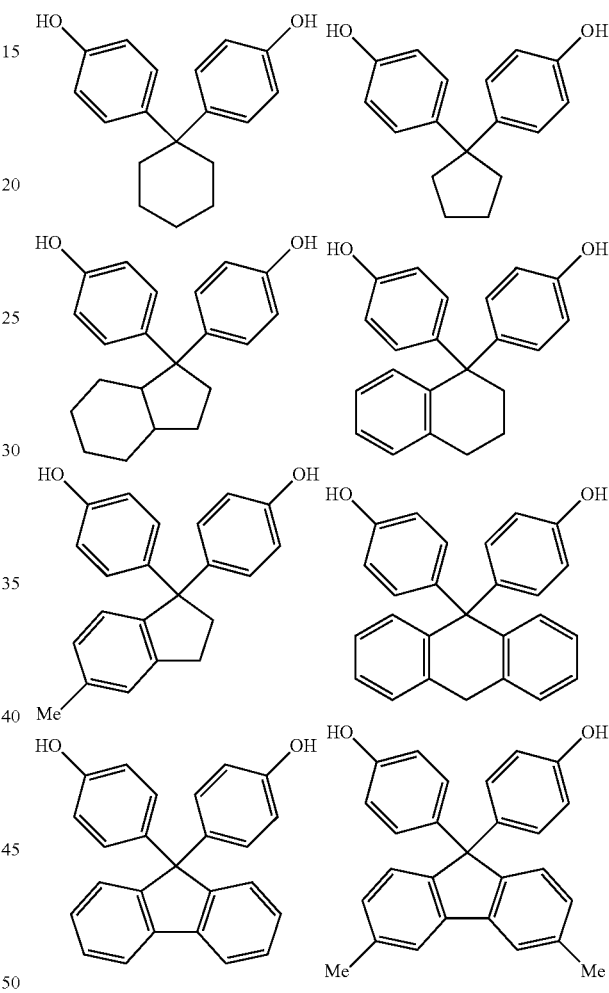

In the embodiment, from the viewpoint of sufficiently increasing the glass transition temperature of the resin cured substance, bisphenol A, bisphenol F, thiobisphenol (hereinafter, occasionally referred to as TDP), 9,9-bis(4-hydroxyphenyl)fluorene (hereinafter, occasionally referred to as BPF), and 1,1-bis(4-hydroxyphenyl)cyclohexane (hereinafter, occasionally referred to as BPC) are preferable.

The (C) component may be used singly or in combinations of two or more.

In the embodiment, a curing agent other than the (C) component mentioned above may be used in combination. Examples of the curing agent that can be used in combination include tertiary aromatic amines typified by N,N-dimethylaniline, tertiary aliphatic amines such as triethylamine, imidazole derivatives, and pyridine derivatives. These may be used singly or in combinations of two or more.

Examples of (D) the polyamide resin particles having an average particle size of 5 to 50 μm (hereinafter, occasionally referred to as a (D) component) used in the embodiment include polymers or copolymers having an amide bond obtained by using an aliphatic amino acid, aliphatic lactam, or aliphatic diamine and an aliphatic carboxylic acid as starting raw materials.

Examples of the amino acid include 6-aminocaproic acid, 11-aminoundecanoic acid, and 12-aminododecanoic acid.

Examples of the lactams include caprolactam, laurolactam, octalactam, and undecanelactam.

Examples of the diamine include tetramethylenediamine, hexamethylenediamine, undecamethylenediamine, dodecamethylenediamine, 2,2,4-trimethylhexamethylenediamine, 2,4,4-trimethylhexamethylenediamine, 5-methylnonamethylenediamine, 2,4-dimethyloctamethylenediamine, m-xylylenediamine, p-xylylenediamine, 1,3-bis(aminomethyl)cyclohexane, 1-amino-3-aminomethyl-3,5,5-trimethylcyclohexane, 3,8-bis(aminomethyl)tricyclodecane, bis(4-aminocyclohexyl)methane, bis(3-methyl-4-aminocyclohexyl)methane, 2,2-bis(4-aminocyclohexyl)propane, and bis(aminopropyl)piperazine.

Examples of the dicarboxylic acid include adipic acid, suberic acid, azelaic acid, sebacic acid, and dodecanedioic acid.

As the polyamide resin particle used in the embodiment, polymers of caprolactam, polymers of laurolactam, copolymers of caprolactam and laurolactam, polyhexamethylene sebacamide (nylon 6/12), polydecamethylene sebacamide (nylon 10/10), polydecamethylene dodecamide (nylon 10/12), polyundecamethylene adipamide (nylon 11/6), polyundecanamide (nylon 11), polydodecanamide (nylon 12), polybis(4-aminocyclohexyl)methanedodecamide (nylon PACM 12), polybis(3-methyl-4-aminocyclohexyl)methanedodecamide (nylon dimethyl PACM 12), and copolymers thereof may be used, for example.

As the average particle size of the polyamide resin particles, 5 to 50 μm are preferable and 10 to 30 μm are more preferable from the viewpoint of controlling the thickness of the surface layer. Here, the average particle size refers to the average value of the measured lengths of the major axes of 100 particles selected arbitrarily from particles that are magnified 200 to 500 times with a scanning electron microscope (SEM).

The (D) component used in the embodiment include (D1) a first polyamide resin particle (hereinafter, occasionally referred to as a (D1) component) and (D2) a second polyamide resin particle (hereinafter, occasionally referred to as a (D2) component) having a higher melting temperature measured in a composition constituting the surface layer than the first polyamide resin particle has. As the (D1) component and the (D2) component used in the embodiment, the same substances as those included in examples of the polyamide resin particle of the (D) component may be used, for example.

As the average particle size of the (D1) component and the (D2) component used in the embodiment, 5 to 50 μm are preferable and 10 to 30 μm are more preferable for both components from the viewpoint of controlling the thickness of the surface layer.

For the melting temperature $M_1$ of the (D1) component used in the embodiment measured in the resin composition 5, it is preferable to be 120 to 170° C., it is more preferable to be 130 to 170° C., and it is still more preferable to be 135 to 170° C. from the viewpoint of melting the (D1) component moderately during the preparation of a fiber-reinforced composite.

For the melting temperature $M_2$ of the (D2) component used in the embodiment measured in the resin composition 5, it is preferable to be 175 to 220° C., it is more preferable to be 175 to 210° C., and it is still more preferable to be 175 to 200° C. from the viewpoint of moderately suppressing the (D2) component melting and entering the reinforcing fiber layer during the preparation of a fiber-reinforced composite material.

For the melting temperature $M_2$ of the (D2) component used in the embodiment in the resin composition 5, it is desirable to be higher than the melting temperature $M_1$ of the (D1) component in the resin composition 5 from the viewpoint of melting the (D1) component moderately and moderately suppressing the (D2) component melting and entering the reinforcing fiber layer during the preparation of a fiber-reinforced composite. For the difference between the melting temperatures $M_2$ and $M_1$ mentioned above, it is preferable to be 5° C. or more, it is more preferable to be 10 to 100° C., and it is still more preferable to be 15 to 70° C. from the viewpoint of melting the (D1) component moderately and moderately suppressing the (D2) component melting and entering the reinforcing fiber layer during the preparation of a fiber-reinforced composite.

As the (D1) component and the (D2) component used in the embodiment, polyamide 12 resin particles, polyamide resin particles made of a copolymer in which caprolactam and laurolactam are copolymerized, and polyamide 1010 resin particles may be used, for example.

In the present specification, the polyamide 12 resin refers to a polyamide resin in which laurolactam is polymerized by ring-opening.

As the polyamide 12 resin particles used in the embodiment, commercially available products, may be used; examples include "VESTOSINT 1111", "VESTOSINT 2070", "VESTOSINT 2157", "VESTOSINT 2158", and "VESTOSINT 2159" (registered trade mark, all manufactured by Daicel-Evonik Ltd.); and "Orgasol 2002 D", "Orgasol 2002 EXD", and "Orgasol 2002 ES3" (registered trade mark, all manufactured by ARKEMA K.K.). It is preferable that the polyamide 12 resin particles be spherical particles, from the viewpoint of preventing the flow characteristics of the resin composition in which the particles are blended from being lowered, but may be non-spherical particles.

The copolymer mentioned above in which caprolactam and laurolactam are copolymerized is what is called polyamide 6/12 or the like. The copolymer mentioned above may be a random copolymer, or may be a block copolymer. As the polyamide 6/12 resin particle, commercially available products may be used; and examples include Orgasol 4000 EXD (registered trademark, manufactured by ARKEMA K.K.).

In the present specification, the polyamide 1010 resin refers to a polyamide resin in which sebacic acid and decamethylenediamine are polycondensed.

As the polyamide 1010 resin particles used in the embodiment, commercially available products may be used; examples include "VESTAMID® Terra DS" (registered trade mark, manufactured by Daicel-Evonik Ltd.).

It is preferable that the (D1) component used in the embodiment be polyamide 12 resin particles or polyamide resin particles made of a copolymer in which caprolactam and laurolactam are copolymerized at a molar ratio of 9:1 to 7:3, from the viewpoint of melting the (D1) component moderately during the preparation of a fiber-reinforced composite material.

For the copolymerization ratio (molar ratio) of caprolactam and laurolactam in the copolymer mentioned above in the case of being used as the (D1) component, it is preferable to be in the range of 1:9 to 3:7, it is more preferable to be in the range of 1:9 to 25:75, and it is still more preferable to be in the range of 1:9 to 2:8. By setting the copolymerization ratio in the range mentioned above, the melting point of the polyamide resin particles and the melting temperature of the polyamide resin particles in the resin composition containing particles can be adjusted to a moderate range, and the interlaminar fracture toughness, the CAI, and the flexural modulus can be improved.

For the melting point of the polyamide 6/12 resin particles in the case of being used as the (D1) component, it is preferable to be 120 to 185° C., it is more preferable to be 130 to 185° C., and it is still more preferable to be 140 to 185° C. from the viewpoint of melting the polyamide 6/12 resin particles moderately during the preparation of a fiber-reinforced composite. Here, the melting point refers to the melting point of the polyamide resin particles themselves.

It is preferable that the (D2) component used in the embodiment be polyamide resin particles made of a copolymer in which caprolactam and laurolactam are copolymerized at a molar ratio of 9:1 to 7:3 or polyamide 1010 resin particles, from the viewpoint of moderately suppressing the (D2) component melting and entering the reinforcing fiber layer during the preparation of a fiber-reinforced composite material.

For the copolymerization ratio (molar ratio) of caprolactam and laurolactam in the copolymer mentioned above in the case of being used as the (D2) component, it is preferable to be in the range of 9:1 to 7:3, it is more preferable to be in the range of 9:1 to 75:25, and it is still more preferable to be in the range of 9:1 to 8:2. By setting the copolymerization ratio in the range mentioned above, the melting point of the polyamide resin particles and the melting temperature of the polyamide resin particles in the resin composition containing particles can be adjusted to a moderate range, and the interlaminar fracture toughness, the CAI, and the flexural modulus can be improved.

For the melting point of the polyamide 6/12 resin particles in the case of being used as the (D2) component, it is preferable to be 186 to 230° C., it is more preferable to be 188 to 220° C., and it is still more preferable to be 190 to 210° C. from the viewpoint of moderately suppressing the polyamide 6/12 resin particles melting and entering the reinforcing fiber layer during the preparation of a fiber-reinforced composite material. Here, the melting point refers to the melting point of the polyamide resin particles themselves.

It is preferable that a combination of the (D1) component and the (D2) component used in the embodiment be a combination of polyamide 12 resin particles as the (D1) component and polyamide 1010 resin particles as the (D2) component, a combination of polyamide 12 resin particles as the (D1) component and polyamide resin particles made of a copolymer in which caprolactam and laurolactam are copolymerized at a molar ratio of 9:1 to 7:3 as the (D2) component, a combination of polyamide resin particles made of a copolymer in which caprolactam and laurolactam are copolymerized at a molar ratio of 1:9 to 3:7 as the (D1) component and polyamide resin particles made of a copolymer in which caprolactam and laurolactam are copolymerized at a molar ratio of 9:1 to 7:3 as the (D2) component, and a combination of polyamide resin particles made of a copolymer in which caprolactam and laurolactam are copolymerized at a molar ratio of 1:9 to 3:7 as the (D1) component and polyamide 1010 resin particles as the (D2) component from the viewpoint of melting the (D1) component moderately and moderately suppressing the (D2) component melting and entering the reinforcing fiber layer during the preparation of a fiber-reinforced composite material.

In the embodiment, for the amounts of the (A) component and the (B) component contained in the resin composition 2, when it is assumed that the total amount of the (A) component and the (B) component is 100 parts by mass, it is preferable that the amount of the (A) component be 65 to 78 parts by mass and the amount of the (B) component be 22 to 35 parts by mass. When the proportion of the contained (A) component is less than 65 parts by mass, that is, when the proportion of the contained (B) component is more than 35 parts by mass, the elastic modulus and the water resistance of the resulting fiber-reinforced composite tend to be reduced and the glass transition temperature of the resin cured substance tends to be reduced.

For the amount of the (C) component contained in the resin composition 2, when it is assumed that the total amount of the (A) component and the (B) component is 100 parts by mass, it is preferable to be 5 to 20 parts by mass and it is more preferable to be 7 to 15 parts by mass. If the amount of the contained (C) component is less than 5 parts by mass, it tends to be difficult to sufficiently increase the interlaminar fracture toughness, the CAI and the flexural modulus in the fiber-reinforced composite material; and in the case of more than 20 parts by mass, mechanical properties such as the glass transition temperature of the cured substance tend to be reduced.

In the embodiment, for the amounts of the (A) component and the (B) component contained in the surface layers 6a and 6b, when it is assumed that the total amount of the (A) component and the (B) component is 100 parts by mass, it is preferable that the amount of the (A) component be 65 to 78 parts by mass and the amount of the (B) component be 22 to 35 parts by mass. If the proportion of the contained (A) component is less than 65 parts by mass, that is, if the proportion of the contained (B) component is more than 35 parts by mass, the elastic modulus and the water resistance of the resulting fiber-reinforced composite tend to be reduced and the glass transition temperature of the resin cured substance tends to be reduced.

For the amount of the (C) component contained in the surface layers 6a and 6b, when it is assumed that the total amount of the (A) component and the (B) component is 100 parts by mass, it is preferable to be 5 to 20 parts by mass and it is more preferable to be 7 to 15 parts by mass. If the amount of the contained (C) component is less than 5 parts by mass, it tends to be difficult to sufficiently increase the CAI and the flexural modulus in the fiber-reinforced composite material; and in the case of more than 20 parts by mass, mechanical properties such as the glass transition temperature of the cured substance tend to be reduced.

For the amount of the (D) component contained in the surface layers 6a and 6b, when it is assumed that the total amount of the (A) component and the (B) component is 100 parts by mass, it is preferable to be 15 to 45 parts by mass and it is more preferable to be 25 to 40 parts by mass. If the amount of the contained (D) component is less than 15 parts by mass, it tends to be difficult to sufficiently increase the interlaminar fracture toughness, the CAI and the flexural modulus in the fiber-reinforced composite material; and in the case of more than 45 parts by mass, the flexural modulus tends to be reduced. In the embodiment, it is preferable that the total amount of the (D1) component and the (D2) component contained be in the range mentioned above.

Regarding the blending ratio of the (D1) component and the (D2) component, it is preferable that the amount of the (D2) component be 10 to 1000 parts by mass, it is more preferable that the above amount be 20 to 500 parts by mass, and it is still more preferable that the above amount be 30 to 300 parts by mass, with respect to 100 parts by mass of the (D1) component, from the viewpoint of sufficiently increasing the interlaminar fracture toughness.

The surface layers 6a and 6b in the prepreg of the embodiment refer to between the prepreg surface and the reinforcing fibers of the reinforcing fiber layer, and the amount mentioned above of the (D) component contained in the surface layer can be calculated on the basis of, for example, the amounts of the (A) component, the (B) component, and the (C) component contained detected between the prepreg surface and the reinforcing fibers of the reinforcing fiber layer.

In the prepreg of the embodiment, another component such as (E) a toughness improver may be blended to the surface layer and the reinforcing fiber layer to the extent that their physical properties are not impaired. Examples of (E) the toughness improver include phenoxy resins and polyethersulfone.

As still another component, a nanocarbon, a fire retardant, a mold release agent, etc. may be blended. Examples of the nanocarbon include carbon nanotubes, fullerene, and derivatives of each of them. Examples of the fire retardant include red phosphorus, phosphoric acid esters such as triphenyl phosphate, tricresyl phosphate, trixylenyl phosphate, cresyl diphenyl phosphate, xylenyl diphenyl phosphate, resorcinol bis(phenyl phosphate), and bisphenol A bis(diphenyl phosphate), and boric acid esters. Examples of the mold release agent include silicon oil, stearic acid esters, and carnauba wax.

As the reinforcing fibers in the embodiment, glass fibers, carbon fibers, graphite fibers, aramid fibers, boron fibers, alumina fibers, silicon carbide fibers, and the like may be used. Two or more of these fibers may be mixed for use. It is preferable to use carbon fibers or graphite fibers and it is more preferable to use carbon fibers in order to obtain a molded product that is lighter in weight and higher in durability.

As the carbon fibers used in the embodiment, either of PAN-based carbon fibers and pitch-based carbon fibers may be used.

In the embodiment, any type of carbon fibers or graphite fibers may be used in accordance with the use. For the tensile elastic modulus in a strand tensile test of the carbon fibers or the graphite fibers, it is preferable to be 150 to 650 GPa, it is more preferable to be 200 to 550 GPa, and it is still more preferable to be 230 to 500 GPa because a composite material that is excellent in impact resistance and has high rigidity and mechanical strength can be obtained. The strand tensile test refers to a test performed on the basis of JIS R 7601 (1986) after carbon fibers or graphite fibers in a bundle form are impregnated with an epoxy resin and curing is performed at a temperature of 130° C. for 35 minutes.

The form of the reinforcing fibers in the prepreg and the fiber-reinforced composite material of the embodiment is not particularly limited; for example, long fibers uniformly extended in one direction, rattans, textiles, mats, knits, braids, short fibers chopped to a length of less than 10 mm, and the like may be used. Here, the long fiber(s) refers to a single fiber or a fiber bundle substantially continuous for 10 mm or more. The short fiber(s) refers to a fiber bundle cut to a length of less than 10 mm. For uses in which it is required for the specific strength and the specific elastic modulus to be high, an arrangement in which a reinforcing fiber bundle is uniformly extended in one direction like the prepreg of the embodiment is most suitable; but also an arrangement of a cloth (textile) form, which is easy to handle, can be used.

In the prepreg of the embodiment, for the amount of reinforcing fibers per unit area, it is preferable to be 25 to 3000 $g/m^2$. If the amount of reinforcing fibers is less than 25 $g/m^2$, it is necessary to increase the number of stacked sheets in order to obtain a prescribed thickness during molding a fiber-reinforced composite material, and operation may be complicated. On the other hand, if the amount of reinforcing fibers is more than 3000 $g/m^2$, the draping properties of the prepreg tend to be poor. When the prepreg is a flat surface or a simple curved surface, the amount of reinforcing fibers may be more than 3000 $g/m^2$. The percentage of contained fibers in the prepreg is preferably 30 to 90 mass %, more preferably 35 to 85 mass %, and still more preferably 40 to 80 mass %. If the content percentage is less than 30 mass %, the amount of the resin is too large; and the advantage of a fiber-reinforced composite material excellent in specific strength and specific elastic modulus may not be obtained, or during the molding of a fiber-reinforced composite material, the amount of heat generated during curing may be too large. If the content percentage is more than 90 mass %, an impregnation defect of the resin occurs and the resulting composite material tends to include a large amount of voids.

Figure 2:
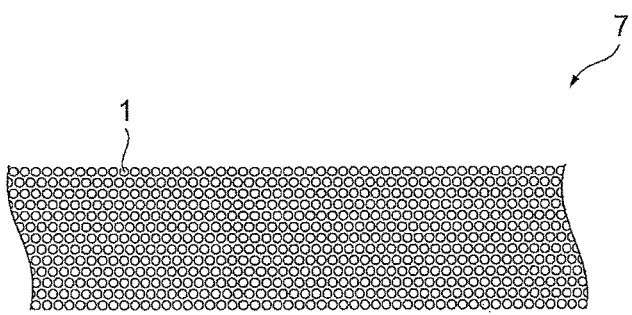
FIG. 2 is schematic cross-sectional views for describing a production method for a prepreg.
Figure 2:
Figure 2:
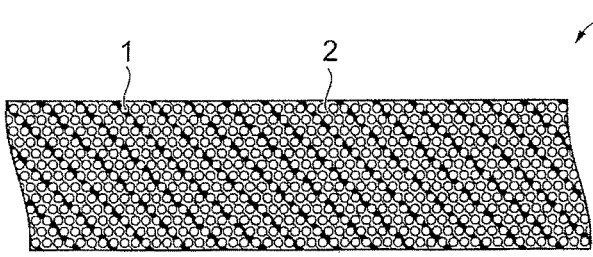
Figure 2:
Figure 2:
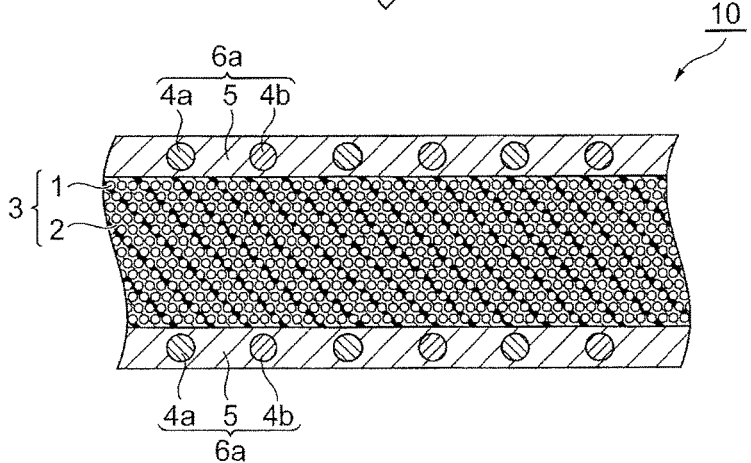
Figure 3:
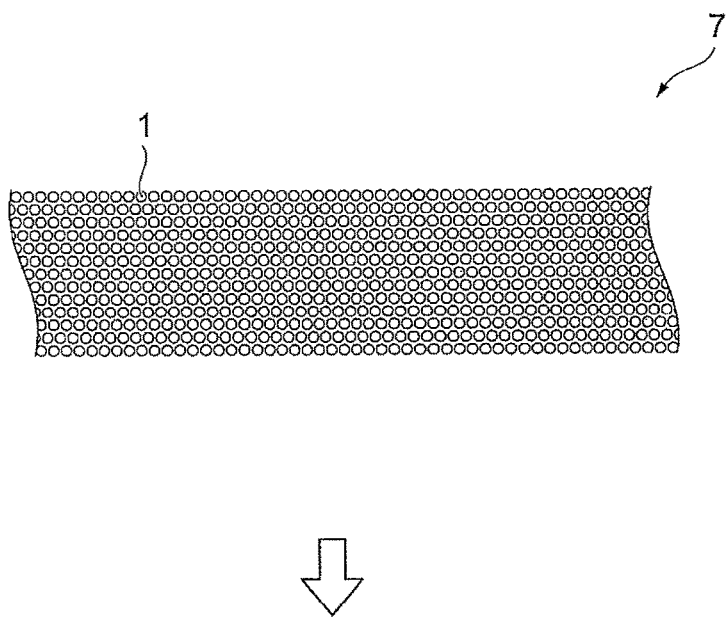
FIG. 3 is schematic cross-sectional views for describing a production method for a prepreg.
Figure 3:
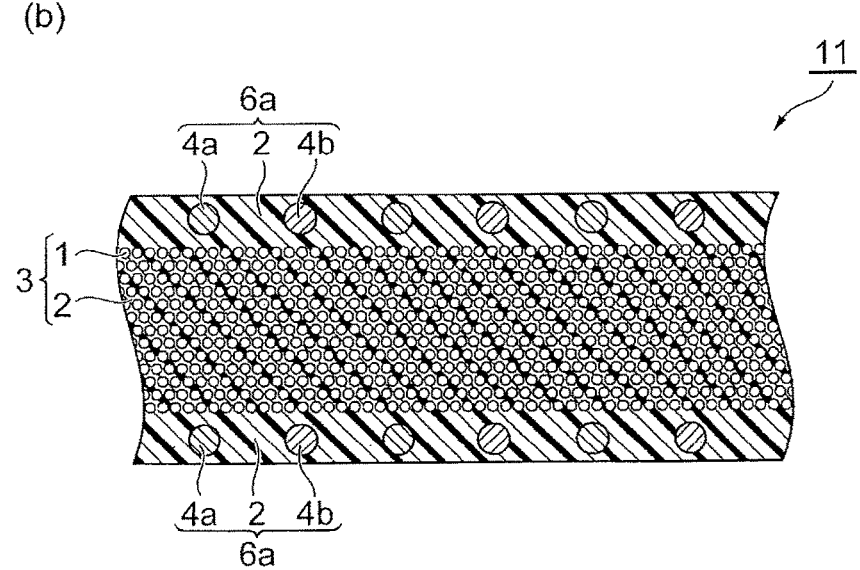

Next, production methods for prepregs according to the embodiment are described. FIG. 2 and FIG. 3 are schematic cross-sectional views for describing production methods for prepregs according to the embodiment. The method shown in FIG. 2 is an embodiment of the production method for the prepreg 10 according to the embodiment described above. In this method, a reinforcing fiber bundle 7 in which reinforcing fibers 1 are uniformly extended in one direction is prepared (a), the reinforcing fiber bundle 7 is impregnated with a first resin composition 2 containing the (A) to (C) components mentioned above to form the reinforcing fiber layer 3 (b), and both surfaces of the reinforcing fiber layer 3 are impregnated with a second resin composition containing the (A) to (C) components and the (D) component mentioned above to form the surface layers 6a and thus the prepreg 10 is obtained (c).

In the method shown in FIG. 3, a reinforcing fiber bundle 7 in which reinforcing fibers 1 are uniformly extended in one direction is prepared (a), and both surfaces of the reinforcing fiber bundle 7 are impregnated with a resin composition containing the (A) to (D) components mentioned above once to form the surface layers 6a made of the resin composition 2 containing the (D) component 4a and 4b with which fibers have not been impregnated and the (A) to (C) components and thus a prepreg 11 is obtained (b).

The prepreg 12 of FIG. 1(b) can be produced by, for example, impregnating a reinforcing fiber bundle with a resin composition containing the (A) to (C) components and then sprinkling the (D) component over the surfaces of the reinforcing fiber bundle impregnated with the resin composition.

Each resin composition with which the reinforcing fiber bundle is impregnated can be prepared by kneading the (A) to (C) components mentioned above and, as necessary, other components, or the (A) to (D) components mentioned above and, as necessary, other components.

The method for kneading a resin composition is not particularly limited; for example, a kneader, a planetary mixer, a biaxial extruder, etc. are used. It is preferable that, from the viewpoint of the dispersibility of the particle components of the (D) component etc., the particles be diffused into liquid resin components beforehand with a homomixer, three rolls, a ball mill, a bead mill, ultrasonic waves, and the like. Furthermore, during mixing with a matrix resin, during preliminary diffusion of particles, or in other cases, it is possible to perform heating or cooling, or pressurization or depressurization, as necessary. After kneading, immediate storage in a refrigerator or a freezer is preferable from the viewpoint of storage stability.

As the viscosity of the resin composition, 10 to 20000 Pa·s at 50° C. are preferable from the viewpoint of the production of a precursor film. 10 to 10000 Pa·s are more preferable, and 50 to 6000 Pa·s are most preferable. In the case of less than 10 Pa·s, the tackiness of the resin composition may be increased, and coating may be difficult. In the case of more than 20000 Pa·s, semisolidification occurs and coating is difficult.

Examples of the method for impregnating fibers with a resin composition include the wet method in which a resin composition is dissolved in a solvent such as methyl ethyl ketone or methanol to be reduced in viscosity and impregnation therewith is performed and the hot melt method (dry method) in which the viscosity is reduced by heating and impregnation is performed.

The wet method is a method in which reinforcing fibers are immersed in a solution of a resin composition and then pulled up and the solvent is vaporized using an oven or the like. The hot melt method is a method in which reinforcing fibers are directly impregnated with a resin composition that has been reduced in viscosity by heating or a method in which a resin composition is once applied onto a mold release paper sheet or the like in a coating manner to fabricate a film, subsequently the film is superposed from both sides or one side of reinforcing fibers, and heating and pressurization are performed to impregnate the reinforcing fibers with the resin. The hot melt method is preferable because there is substantially no solvent remaining in the prepreg.

The prepreg according to the embodiment can be made into a fiber-reinforced composite material by a method in which, after stacking, the resin is cured by heating while pressure is applied to the stacked matter or other methods. Here, examples of the method for applying heat and pressure include the press molding method, the autoclave molding method, the bagging molding method, the wrapping tape method, and the internal pressure molding method. The wrapping tape method is a method in which a prepreg is wound around a cored bar such as a mandrel and a tubular body made of a fiber-reinforced composite material is molded, and is a method suitable in fabricating stick-like bodies such as golf shafts and fishing rods. More specifically, it is a method in which a prepreg is wound around a mandrel, a wrapping tape formed of a thermoplastic film is wound on the outside of the prepreg in order to fix and apply pressure to the prepreg, the resin is cured by heating in an oven, and then the cored bar is taken out to obtain a tubular body.

The internal pressure molding method is a method in which a preform in which a prepreg is wound around an internal pressure applier such as a tube made of a thermoplastic resin is set in a mold, and subsequently a high pressure gas is introduced into the internal pressure applier to apply pressure and at the same time the mold is heated to perform molding. This method is preferably used in molding complicated shaped objects such as golf shafts, bats, and rackets for tennis, badminton, etc.

A resin composition containing particles that contains the (A) to (D) components mentioned above and, as necessary, other components can be suitably used for the preparation of the prepreg described above. A resin composition containing particles in which the amount of the contained (D) component is 15 to 45 parts by mass and preferably 25 to 40 parts by mass when it is assumed that the total amount of the (A) component and the (B) component is 100 parts by mass can be suitably used as the material for forming the surface layer of the prepreg. For the resin composition containing particles, it is preferable that the glass transition temperature of its cured substance obtained by increasing the temperature at a temperature increase rate of 2.0° C./minute from room temperature to 185° C. and then performing curing under the conditions of the same temperature and 2 hours be 190° C. or more.

Figure 4:
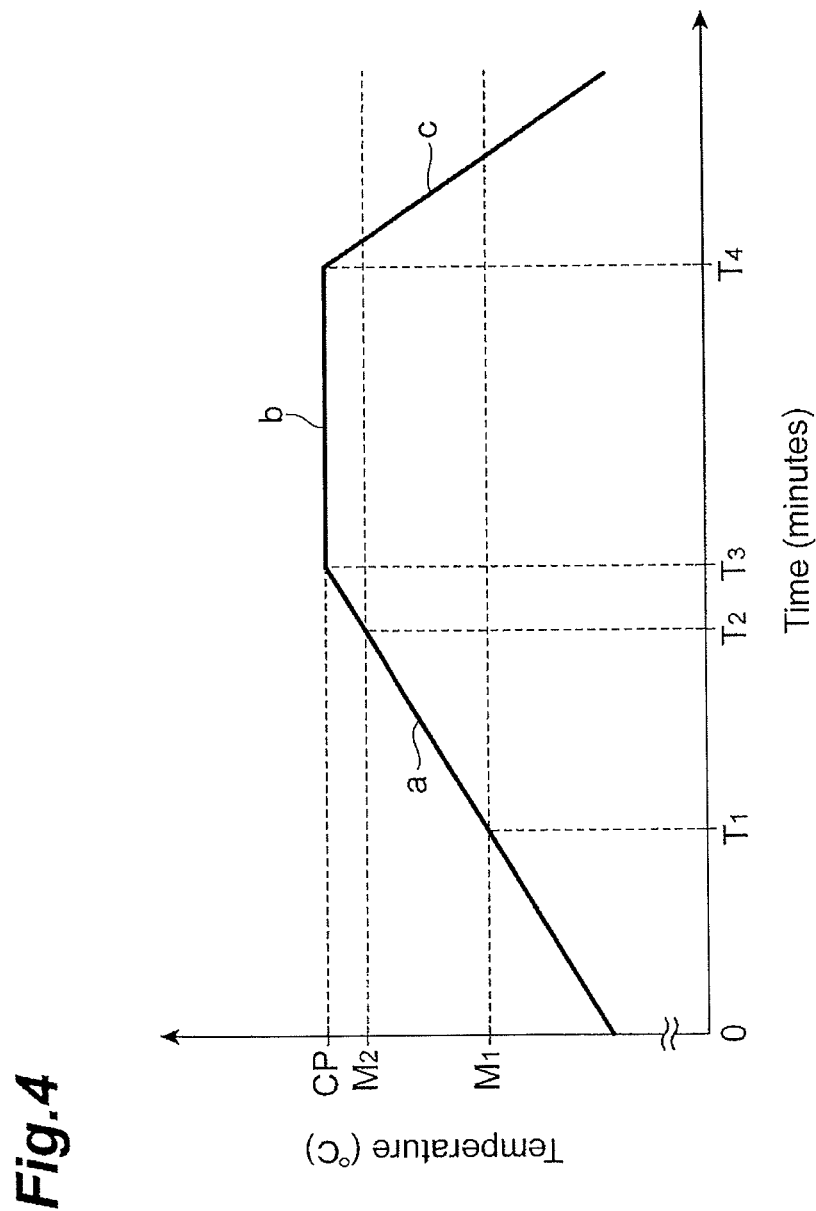
FIG. 4 is a schematic diagram illustrating an example of a curing profile in a production method for a fiber-reinforced composite material according to an embodiment of the present invention.

FIG. 4 is a schematic diagram illustrating an example of a curing profile. In the figure, $M_1$ denotes the melting temperature (° C.) of the (D1) component measured in a composition constituting the surface layer, and $M_2$ denotes the melting temperature (° C.) of the (D2) component measured in a composition constituting the surface layer. In the curing profile shown in FIG. 4, a process is illustrated in which a stacked body obtained by stacking the prepreg described above plurally is increased in temperature to a predetermined curing point CP (° C.) at a predetermined temperature increase rate (line a in the figure), and the stacked body is retained at the predetermined curing point CP (° C.) for a predetermined time ($T_4-T_3$) to cure the resin (line b in the figure), and thereafter the temperature is decreased.

The curing point CP (° C.) mentioned above is appropriately set depending on the type of the (C) component, the blending ratio between the (A) component and the (B) component, or the like so that the resin composition 2 containing the (A) component to (C) component mentioned above is sufficiently cured.

The curing point CP (° C.) can be set to a temperature between 140 and 200° C., for example, and it is preferable that the above curing point be set to a temperature between 160 and 195° C., from the viewpoint of productivity and controlling the melted state of the polyamide. Here, the curing point refers to the temperature of a prepreg.

In the embodiment, for the CP, it is preferable to be a temperature higher than $M_1$° C. by 1 to 100° C., it is more preferable to be a temperature higher than $M_1$° C. by 5 to 70° C., and it is still more preferable to be a temperature higher than $M_1$° C. by 10 to 50° C. from the viewpoint of melting the (D1) component moderately.

In addition, it is more preferable that the CP be a temperature in the range of −20 to 10° C., and it is still more preferable that the CP be a temperature in the range of −10 to 10° C., with the upper limit being a temperature higher than $M_2$° C. by 10° C., from the viewpoint of curing the resin sufficiently and moderately suppressing the (D2) component melting and entering the reinforcing fiber layer.

In the embodiment, the (D1) component and the (D2) component may be selected so as to satisfy the conditions mentioned above using the curing point CP (° C.) as a benchmark. Also in this case, it is preferable that the relation described above between the (D1) component and the (D2) component be satisfied. Alternatively, the melting temperatures $M_1$ and $M_2$° C. may be used as a benchmark to perform primary curing at a temperature satisfying $M_1 < CP \leq M_2$ followed by additional secondary curing at a temperature higher than $M_2$ to allow the curing to progress sufficiently.

For the temperature increase rate to the curing point CP (° C.) mentioned above, it is preferable to be 0.1 to 5.0° C./minute and it is more preferable to be 0.3 to 3.0° C./minute. Although the temperature increase rate to a temperature less than $M_1$ (° C.) may be different from the temperature increase rate from $M_1$ (° C.) to CP (° C.), in the embodiment it is preferable that at least the temperature increase rate from $M_1$ to CP be in the range mentioned above.

In the case where the curing point CP (° C.) mentioned above is higher than $M_2$° C., the temperature increase rate to a temperature less than $M_1$° C., the temperature increase rate from $M_1$ (° C.) to $M_2$ (° C.), and the temperature increase rate from $M_2$ (° C.) to CP (° C.) may be different.

In the embodiment, for the temperature increase rate to a temperature less than $M_1$ (° C.), it is preferable to be 0.1 to 10.0° C./minute, it is more preferable to be 0.1 to 5.0° C./minute, and it is still more preferable to be 0.3 to 3.0° C./minute. For the temperature increase rate from $M_1$ (° C.) to $M_2$ (° C.), it is preferable to be 0.1 to 5.0° C./minute and it is more preferable to be 0.3 to 3.0° C./minute. For the temperature increase rate from $M_2$ (° C.) to CP (° C.), it is preferable to be 0.1 to 5.0° C./minute and it is more preferable to be 0.3 to 3.0° C./minute.

It is preferable that the pressure in the heating be 0.2 to 1.0 MPa, and it is more preferable that the above pressure be 0.3 to 0.8 MPa.

After heating, the temperature can be decreased at a rate of −0.3 to −3.0° C./minute.

Thus, a fiber-reinforced composite material can be obtained.

Figure 5:
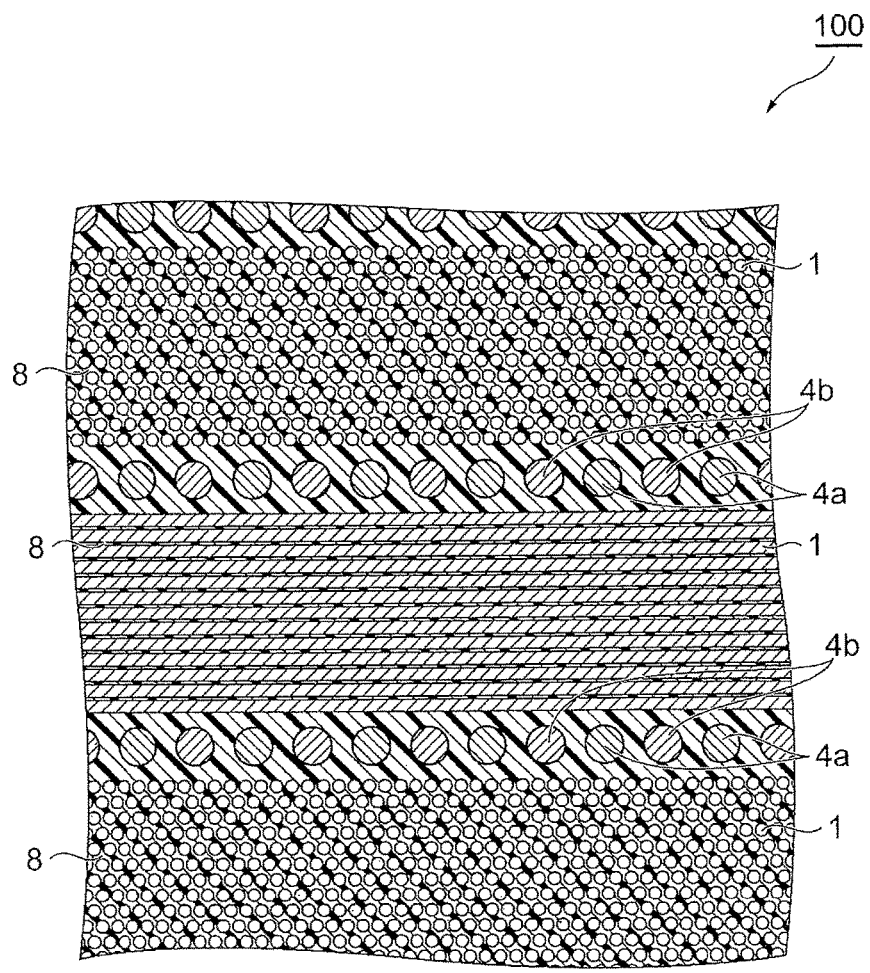
FIG. 5 is a schematic cross-sectional view for describing a fiber-reinforced composite material.

FIG. 5 is a schematic cross-sectional view for describing a fiber-reinforced composite material according to an embodiment of the present invention. A fiber-reinforced composite material 100 shown in FIG. 5 comprises reinforcing fibers 1, a resin cured substance 8, and polyamide resin particles 4a and 4b. The fiber-reinforced composite material 100 can be obtained by the production method of the embodiment described above, that is, by stacking any one of the prepregs 10, 11, and 12 plurally and performing heating under increased pressure. The polyamide resin particles, which are illustrated in FIG. 5 in the same way as ones in the surface layer of the prepreg, are melted by increasing pressure and heating to deform due to flowing and bonding between the particles.

In the fiber-reinforced composite material, for the volume proportion of $C_1$ in the total amount of the amount $C_1$ of the polyamide resin contained in the resin cured substance between reinforcing fiber layers and the amount $C_2$ of the polyamide resin contained in the reinforcing fiber layers, $\{C_1/(C_1+C_2)\} \times 100$, it is preferable to be 70 volume % or more and it is more preferable to be 80 volume % or more.

The amount of the contained polyamide resin is found by analyzing, by microscopic observation, a cross section of the fiber-reinforced composite material taken along a plane orthogonal to the direction in which an arbitrary reinforcing fiber in the fiber-reinforced composite material extends and performing image analysis to observe the distribution of the polyamide resin.

The fiber-reinforced composite material obtained by the method of the embodiment can be obtained also by directly impregnating a reinforcing fiber matrix with a resin composition and performing curing. For example, the production can be performed by a method in which a reinforcing fiber matrix is placed in a mold and then a resin composition containing the (A) to (D) components mentioned above is poured in followed by impregnation and curing, or a method in which a reinforcing fiber matrix and a film formed of a resin composition containing the (A) to (D) components mentioned above are stacked and the stacked body is heated and pressurized. The film mentioned above can be obtained by applying a prescribed amount of a resin composition with a uniform thickness onto a mold release paper sheet or a mold release film beforehand. Examples of the reinforcing fiber matrix include long fibers uniformly extended in one direction, bidirectional textiles, unwoven fabrics, mats, knits, and braids. The stacking herein includes not only the case where fiber matrices are simply superposed but also the case where preforming is performed by attachment to various molds or core materials. As the core materials, foam cores, honeycomb cores, and the like are preferably used. As the foam cores, urethanes and polyimides are preferably used. As the honeycomb cores, aluminum cores, glass cores, aramid cores, and the like are preferably used.

In the fiber-reinforced composite material obtained by the method of the embodiment, for the compressive strength after impact (CAI) measured in accordance with ASTM D7136 and D7137, it is preferable to be 210 MPa or more and it is more preferable to be 220 MPa or more.

In the fiber-reinforced composite material obtained by the method of the embodiment, for the mode I interlaminar fracture toughness value (G1c) measured in accordance with ASTM D5528, it is preferable to be 250 $J/m^2$ or more and it is more preferable to be 300 $J/m^2$ or more.

In the fiber-reinforced composite material obtained by the method of the embodiment, for the mode II interlaminar fracture toughness value (G2c) measured in accordance with Composite Materials Handbook 17-1, it is preferable to be 1500 $J/m^2$ or more and it is more preferable to be 1800 $J/m^2$ or more.

In the fiber-reinforced composite material obtained by the method of the embodiment, for the glass transition temperature of the resin cured substance, it is preferable to be 180° C. or more and it is more preferable to be 190° C. or more.

The fiber-reinforced composite material obtained by the method of the embodiment having the physical properties mentioned above is suitably used for railroad vehicles, aircraft, building members, and other general industrial uses.

EXAMPLES

The present invention will now be specifically described using Examples, but the present invention is not limited to them. The measurements of various physical properties are based on the following methods. The results are shown in Tables 1 to 4.

Examples 1 to 21 and Comparative Examples 1 to 6

For Examples and Comparative Examples, the source materials were mixed with heating at the ratios shown in Tables 1 to 4, and a first resin composition containing no particles (the "first" composition in Table) and a second resin composition containing particles (the "second" composition in Table) were obtained. The source materials used here are as follows.

The (A) component: a benzoxazine resin
F-a: a bisphenol F-aniline type (F-a type benzoxazine, manufactured by SHIKOKU CHEMICALS CORPORATION)

P-a: a phenol-aniline type (P-a type benzoxazine, manufactured by SHIKOKU CHEMICALS CORPORATION)
The (B) component: an epoxy resin
2021P: "CELLOXIDE" (registered trademark) 2021P (manufactured by Daicel Chemical Industries, Ltd.)
The (C) component: a curing agent
TDP (bis(4-hydroxyphenyl)sulfide, manufactured by Tokyo Chemical Industry Co., Ltd.)
BPF (9,9-bis(4-hydroxyphenyl)fluorene, manufactured by Osaka Gas Chemicals Co., Ltd.)
The (D) component: polyamide resin particles
The (D1) component
PA 12 (1): polyamide 12 resin particles (VESTOSINT 2158, average particle size: 20 μm, manufactured by Daicel-Evonik Ltd.)
PA 12 (2): polyamide 12 resin particles (VESTOSINT 2159, average particle size: 10 μm, manufactured by Daicel-Evonik Ltd.)
PA 6/12 (20/80): particles made of a polyamide 6/12 copolymer (a random copolymer) in which caprolactam and laurolactam are copolymerized at a molar ratio of 20:80, (average particle size: 25 μm)

The (D2) component
PA 6/12 (80/20): particles made of a polyamide 6/12 copolymer (a random copolymer) in which caprolactam and laurolactam are copolymerized at a molar ratio of 80:20, (average particle size: 20 μm)
PA 6/12 (75/25): particles made of a polyamide 6/12 copolymer (a random copolymer) in which caprolactam and laurolactam are copolymerized at a molar ratio of 75:25, (average particle size: 20 μm)
PA 6/12 (90/10): particles made of a polyamide 6/12 copolymer (a random copolymer) in which caprolactam and laurolactam are copolymerized at a molar ratio of 90:10, (average particle size: 20 μm)
PA 1010 (1): polyamide 12 resin particles (VESTOSINT 9158, average particle size: 20 μm, manufactured by Daicel-Evonik Ltd.)
PA 1010 (2): polyamide 12 resin particles (VESTOSINT 9159, average particle size: 10 μm, manufactured by Daicel-Evonik Ltd.)
The (E) component: a toughness improver
YP 70: a phenoxy resin (YP-70, manufactured by NIPPON STEEL & SUMIKIN CHEMICAL CO., LTD.)

TABLE 1

| Component | Abbreviation | Example 1 First | Example 1 Second | Example 2 First | Example 2 Second | Example 3 First | Example 3 Second | Example 4 First | Example 4 Second | Example 5 First | Example 5 Second |
|---|---|---|---|---|---|---|---|---|---|---|---|
| (A) Benzoxazine resin | F-a | 70 | 70 | 55 | 55 | 50 | 50 | 70 | 70 | 70 | 70 |
|  | P-a | 5 | 5 | 20 | 20 | 25 | 25 | 5 | 5 | 5 | 5 |
| (B) Epoxy resin | 2021P | 25 | 25 | 25 | 25 | 25 | 25 | 25 | 25 | 25 | 25 |
| (C) Curing agent | TDP | — | — | — | — | — | — | — | — | — | — |
|  | BPF | 10 | 10 | 10 | 10 | 10 | 10 | 10 | 10 | 10 | 10 |
| (D) Polyamide resin particles | PA12 (1) | — | — | — | — | — | — | — | — | — | 8 |
|  | PA12 (2) | — | 14.5 | — | 14.5 | — | 14.5 | — | 8 | — | — |
|  | PA1010 | — | 14.5 | — | 14.5 | — | 14.5 | — | 21 | — | 21 |
| (E) Toughness improver | YP70 | 5 | 5 | 5 | 5 | 5 | 5 | 5 | 5 | 5 | 5 |
| Melting temperature of polyamide resin particles (° C.) (in second resin composition) |  | — | 167 183 | — | 167 183 | — | 167 183 | — | 167 183 | — | 167 183 |
| Curing point (° C.) |  | — | 185 | — | 185 | — | 185 | — | 185 | — | 185 |
| Glass transition temperature (° C.) |  | — | 194 | — | 190 | — | 192 | — | 194 | — | 194 |
| Flexural modulus (MPa) |  | — | 4020 | — | 4020 | — | 3950 | — | 4060 | — | 4060 |
| CAI (MPa) |  |  | 316 |  | 319 |  | 314 |  | 283 |  | 270 |
| G1c (J/m$^2$) |  |  | 482 |  | 366 |  | 478 |  | 338 |  | 318 |
| G2c (J/m$^2$) |  |  | 2284 |  | 2179 |  | 2282 |  | 1989 |  | 1910 |
| Abundance ratio (volume %) of polyamide resin between carbon fiber layers |  |  | 85 |  | 80 |  | 78 |  | 83 |  | 88 |

| Component | Abbreviation | Example 6 First | Example 6 Second | Comparative Example 1 First | Comparative Example 1 Second | Comparative Example 2 First | Comparative Example 2 Second |
|---|---|---|---|---|---|---|---|
| (A) Benzoxazine resin | F-a | 70 | 70 | 70 | 70 | 70 | 70 |
|  | P-a | 5 | 5 | 5 | 5 | 5 | 5 |
| (B) Epoxy resin | 2021P | 25 | 25 | 25 | 25 | 25 | 25 |
| (C) Curing agent | TDP | 10 | 10 | 10 | 10 | — | — |
|  | BPF | — | — | — | — | 10 | 10 |
| (D) Polyamide resin particles | PA12 (1) | — | — | — | 29 | — | — |
|  | PA12 (2) | — | 14.5 | — | — | — | — |
|  | PA1010 | — | 14.5 | — | — | — | 29 |
| (E) Toughness improver | YP70 | 5 | 5 | 5 | 5 | 5 | 5 |
| Melting temperature of polyamide resin particles (° C.) (in second resin composition) |  | — | 159 176 | — | 156 | — | 183 |
| Curing point (° C.) |  | — | 185 | — | 185 | — | 185 |
| Glass transition temperature (° C.) |  | — | 194 | — | 194 | — | 194 |

TABLE 1-continued

|  |  |  |  |  |  |  |
|---|---|---|---|---|---|---|
| Flexural modulus (MPa) | — | 4330 | — | 3920 | — | 4280 |
| CAI (MPa) |  | 271 |  | 200 |  | 227 |
| G1c (J/m$^2$) |  | 272 |  | 245 |  | 250 |
| G2c (J/m$^2$) |  | 2438 |  | 1873 |  | 1835 |
| Abundance ratio (volume %) of polyamide resin between carbon fiber layers |  | 82 |  | 30 |  | 83 |

TABLE 2

| Component | Abbreviation | Example 7 First | Example 7 Second | Example 8 First | Example 8 Second | Example 9 First | Example 9 Second | Example 10 First | Example 10 Second | Example 11 First | Example 11 Second | Comparative Example 3 First | Comparative Example 3 Second | Comparative Example 4 First | Comparative Example 4 Second |
|---|---|---|---|---|---|---|---|---|---|---|---|---|---|---|---|
| (A) Benzoxazine resin | F-a | 70 | 70 | 70 | 70 | 70 | 70 | 70 | 70 | 70 | 70 | 70 | 70 | 70 | 70 |
|  | P-a | 5 | 5 | 5 | 5 | 5 | 5 | 5 | 5 | 5 | 5 | 5 | 5 | 5 | 5 |
| (B) Epoxy resin | 2021P | 25 | 25 | 25 | 25 | 25 | 25 | 25 | 25 | 25 | 25 | 25 | 25 | 25 | 25 |
| (C) Curing agent | BPF | 10 | 10 | 10 | 10 | 10 | 10 | 10 | 10 | 10 | 10 | 10 | 10 | 10 | 10 |
| (D) Polyamide resin particles | PA6/12 (20/80) | — | 14.5 | — | 10 | — | 19 | — | 14.5 | — | 19 | — | — | — | 29 |
|  | PA1010 (1) | — | 14.5 | — | 19 | — | 10 | — | — | — | — | — | 29 | — | — |
|  | PA1010 (2) | — | — | — | — | — | — | — | 14.5 | — | 10 | — | — | — | — |
| (E) Toughness improver | YP70 | 5 | 5 | 5 | 5 | 5 | 5 | 5 | 5 | 5 | 5 | 5 | 5 | 5 | 5 |
| Melting temperature of polyamide resin particles (° C.) (in second resin composition) |  | — | 141 184 | — | 142 183 | — | 141 184 | — | 141 181 | — | 141 184 | — | 183 | — | 141 |
| Curing point (° C.) |  |  | 185 |  | 185 |  | 185 |  | 185 |  | 185 |  | 185 |  | 185 |
| Glass transition temperature (° C.) |  | — | 190 | — | 190 | — | 190 | — | 190 | — | 190 | — | 190 | — | 187 |
| Flexural modulus (MPa) |  | — | 4320 | — | 4380 | — | 4110 | — | 4290 | — | 4240 | — | 4280 | — | 4020 |
| CAI (MPa) |  |  | 220 |  | 210 |  | 235 |  | 229 |  | 255 |  | 227 |  | 175 |
| G1c (J/m$^2$) |  |  | 244 |  | 241 |  | 285 |  | 244 |  | 251 |  | 250 |  | 140 |
| G2c (J/m$^2$) |  |  | 2088 |  | 2006 |  | 2132 |  | 1980 |  | 2273 |  | 1835 |  | 1651 |
| Abundance ratio (volume %) of polyamide resin between carbon fiber layers |  |  | 75 |  | 85 |  | 78 |  | 80 |  | 81 |  | 81 |  | 55 |

TABLE 3

| Component | Abbreviation | Example 12 First | Example 12 Second | Example 13 First | Example 13 Second | Example 14 First | Example 14 Second | Example 15 First | Example 15 Second | Example 16 First | Example 16 Second | Comparative Example 5 First | Comparative Example 5 Second | Comparative Example 6 First | Comparative Example 6 Second |
|---|---|---|---|---|---|---|---|---|---|---|---|---|---|---|---|
| (A) Benzoxazine resin | F-a | 70 | 70 | 70 | 70 | 70 | 70 | 70 | 70 | 70 | 70 | 70 | 70 | 70 | 70 |
|  | P-a | 5 | 5 | 5 | 5 | 5 | 5 | 5 | 5 | 5 | 5 | 5 | 5 | 5 | 5 |
| (B) Epoxy resin | 2021P | 25 | 25 | 25 | 25 | 25 | 25 | 25 | 25 | 25 | 25 | 25 | 25 | 25 | 25 |
| (C) Curing agent | BPF | 10 | 10 | 10 | 10 | 10 | 10 | 10 | 10 | 10 | 10 | 10 | 10 | 10 | 10 |
| (D) Polyamide resin particles | PA12 (1) | — | 10 | — | — | — | — | — | 19 | — | 19 | — | — | — | 29 |
|  | PA12 (2) | — | — | — | 14.5 | — | 19 | — | — | — | — | — | — | — | — |
|  | PA6/12 (80/20) | — | 19 | — | 14.5 | — | 10 | — | — | — | — | — | 29 | — | — |
|  | PA6/12 (75/25) | — | — | — | — | — | — | — | — | — | 10 | — | — | — | — |
|  | PA6/12 (90/10) | — | — | — | — | — | — | — | 10 | — | — | — | — | — | — |
| (E) Toughness improver | YP70 | 5 | 5 | 5 | 5 | 5 | 5 | 5 | 5 | 5 | 5 | 5 | 5 | 5 | 5 |
| Melting temperature of polyamide resin particles (° C.) (in second resin composition) |  | — | 162 180 | — | 162 179 | — | 162 181 | — | 161 177 | — | 161 184 | — | 180 | — | 156 |
| Curing point (° C.) |  |  | 185 |  | 185 |  | 185 |  | 185 |  | 185 |  | 185 |  | 185 |
| Glass transition temperature (° C.) |  | — | 190 | — | 191 | — | 191 | — | 190 | — | 192 | — | 190 | — | 190 |
| Flexural modulus (MPa) |  | — | 4330 | — | 4220 | — | 4190 | — | 4080 | — | 4390 | — | 4210 | — | 3920 |
| CAI (MPa) |  |  | 289 |  | 285 |  | 295 |  | 281 |  | 288 |  | 282 |  | 200 |
| G1c (J/m$^2$) |  |  | 270 |  | 265 |  | 258 |  | 254 |  | 254 |  | 217 |  | 245 |
| G2c (J/m$^2$) |  |  | 2003 |  | 2189 |  | 2211 |  | 2397 |  | 2400 |  | 2262 |  | 1873 |
| Abundance ratio (volume %) of polyamide resin between carbon fiber layers |  |  | 83 |  | 80 |  | 75 |  | 75 |  | 81 |  | 92 |  | 42 |

TABLE 4

| Component | Abbreviation | Example 17 First | Example 17 Second | Example 18 First | Example 18 Second | Example 19 First | Example 19 Second | Example 20 First | Example 20 Second | Example 21 First | Example 21 Second | Comparative Example 5 First | Comparative Example 5 Second | Comparative Example 4 First | Comparative Example 4 Second |
|---|---|---|---|---|---|---|---|---|---|---|---|---|---|---|---|
| (A) Benzoxazine resin | F-a | 70 | 70 | 70 | 70 | 70 | 70 | 70 | 70 | 70 | 70 | 70 | 70 | 70 | 70 |
|  | P-a | 5 | 5 | 5 | 5 | 5 | 5 | 5 | 5 | 5 | 5 | 5 | 5 | 5 | 5 |
| (B) Epoxy resin | 2021P | 25 | 25 | 25 | 25 | 25 | 25 | 25 | 25 | 25 | 25 | 25 | 25 | 25 | 25 |
| (C) Curing agent | BPF | 10 | 10 | 10 | 10 | 10 | 10 | 10 | 10 | 10 | 10 | 10 | 10 | 10 | 10 |
| (D) Polyamide resin particles | PA6/12 (20/80) | — | 10 | — | 10 | — | 10 | — | 14.5 | — | 19 | — | — | — | 29 |
|  | PA6/12 (80/20) | — | 19 | — | — | — | — | — | 14.5 | — | — | — | 29 | — | — |
|  | PA6/12 (75/25) | — | — | — | 19 | — | — | — | — | — | — | — | — | — | — |
|  | PA6/12 (90/10) | — | — | — | — | — | 19 | — | — | — | 10 | — | — | — | — |
| (E) Toughness improver | YP70 | 5 | 5 | 5 | 5 | 5 | 5 | 5 | 5 | 5 | 5 | 5 | 5 | 5 | 5 |
| Melting temperature of polyamide resin particles (° C.) (in second resin composition) |  | — | 140 / 178 | — | 142 / 179 | — | 141 / 184 | — | 141 / 181 | — | 141 / 184 | — | 180 | — | 141 |
| Curing point (° C.) |  |  | 185 |  | 185 |  | 185 |  | 185 |  | 185 |  | 185 |  | 185 |
| Glass transition temperature (° C.) |  | — | 190 | — | 190 | — | 190 | — | 190 | — | 190 | — | 191 | — | 190 |
| Flexural modulus (MPa) |  | — | 4600 | — | 4530 | — | 4610 | — | 4380 | — | 4240 | — | 4210 | — | 4020 |
| CAI (MPa) |  |  | 291 |  | 289 | 289 | 296 |  | 281 |  | 282 |  | 175 |  |  |
| G1c (J/m²) |  |  | 232 |  | 227 | 221 | 207 |  | 219 |  | 217 |  | 140 |  |  |
| G2c (J/m²) |  |  | 2300 |  | 2264 | 2195 | 2290 |  | 2285 |  | 2262 |  | 1651 |  |  |
| Abundance ratio (volume %) of polyamide resin between carbon fiber layers |  |  | 85 |  | 83 | 81 | 82 |  | 86 |  | 92 |  | 55 |  |  |

<Production of a Prepreg>

The first and second resin compositions obtained were each applied onto a mold release paper sheet at 70 to 100° C. to obtain a first resin film with 18 g/m² and a second resin film with 25 g/m². The first resin film obtained was supplied from the upper and lower sides of carbon fibers uniformly extended in one direction and the space between fibers was impregnated therewith to form a carbon fiber layer. Subsequently, the second resin film was laminated from the upper and lower sides of the carbon fiber layer to form surface layers; thus, a prepreg was prepared. The amount of carbon fibers per unit area of the prepreg was 150 g/m², and the total amount of the resin composition in the carbon fiber layer and the surface layers (amount of matrix resin) was 86 g/m².

<Measurement of the Melting Point of the Polyamide Resin Particles>

The first polyamide resin particles that are the (D1) component mentioned above and the second polyamide resin particles that are the (D2) component mentioned above were increased in temperature at a rate of 10° C./minute from 25° C. using a differential scanning calorimeter (DSC), and the temperature of the top of the resulting endothermic peak was taken as the melting point of the polyamide resin particles. The melting point of the polyamide 12 resin particles was 184° C., the melting point of the polyamide 6/12 resin particles (20/80) was 164° C., the melting point of the polyamide 6/12 (80/20) resin particles was 194° C., the melting point of the polyamide 6/12 (75/25) resin particles was 187° C., the melting point of the polyamide 6/12 (90/10) resin particles was 200° C., and the melting point of the polyamide 1010 resin particles was 205° C.

<Measurement of the Melting Temperature of the Polyamide Resin Particles in the Second Resin Composition>

Figure 6:
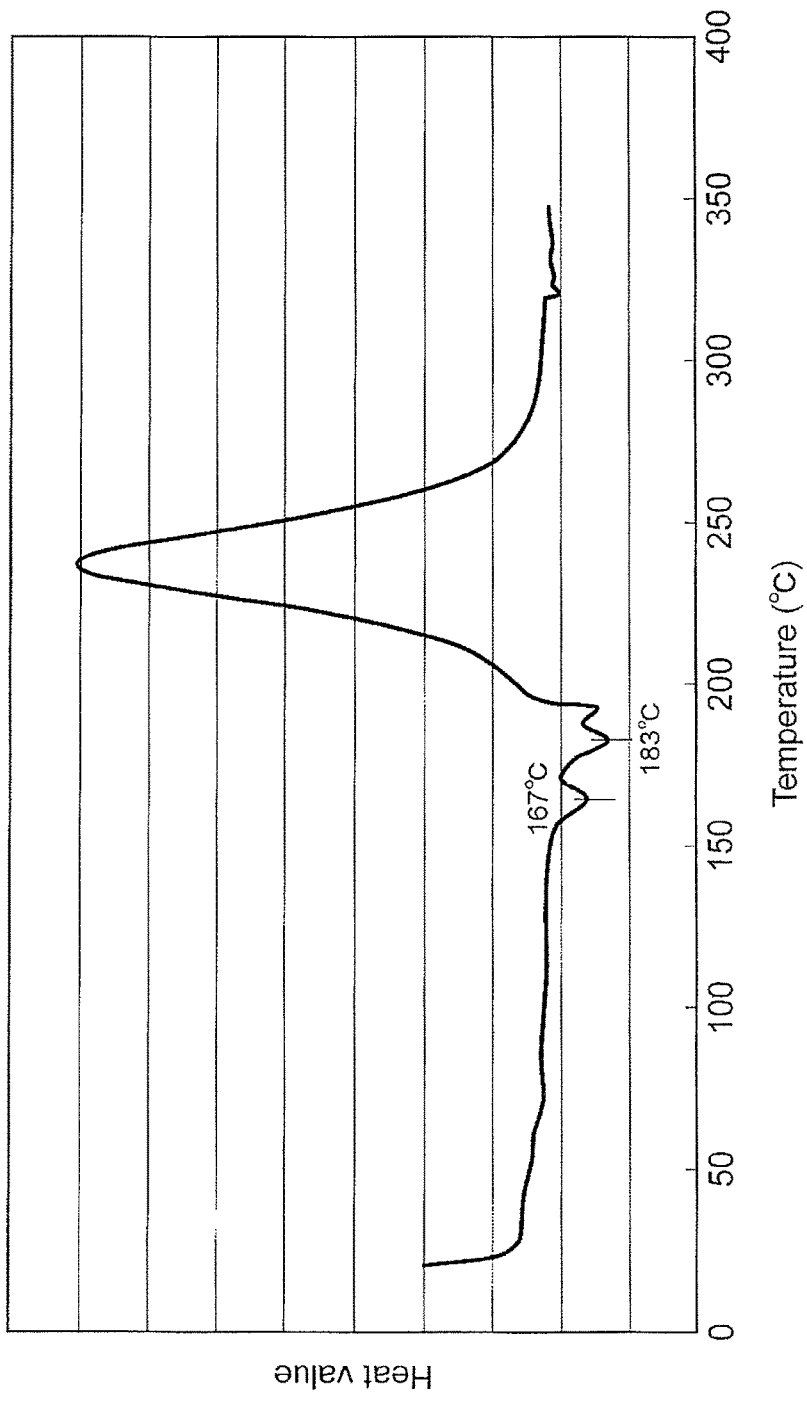
FIG. 6 is a DSC chart of a second resin composition of Example 1.
Figure 7:
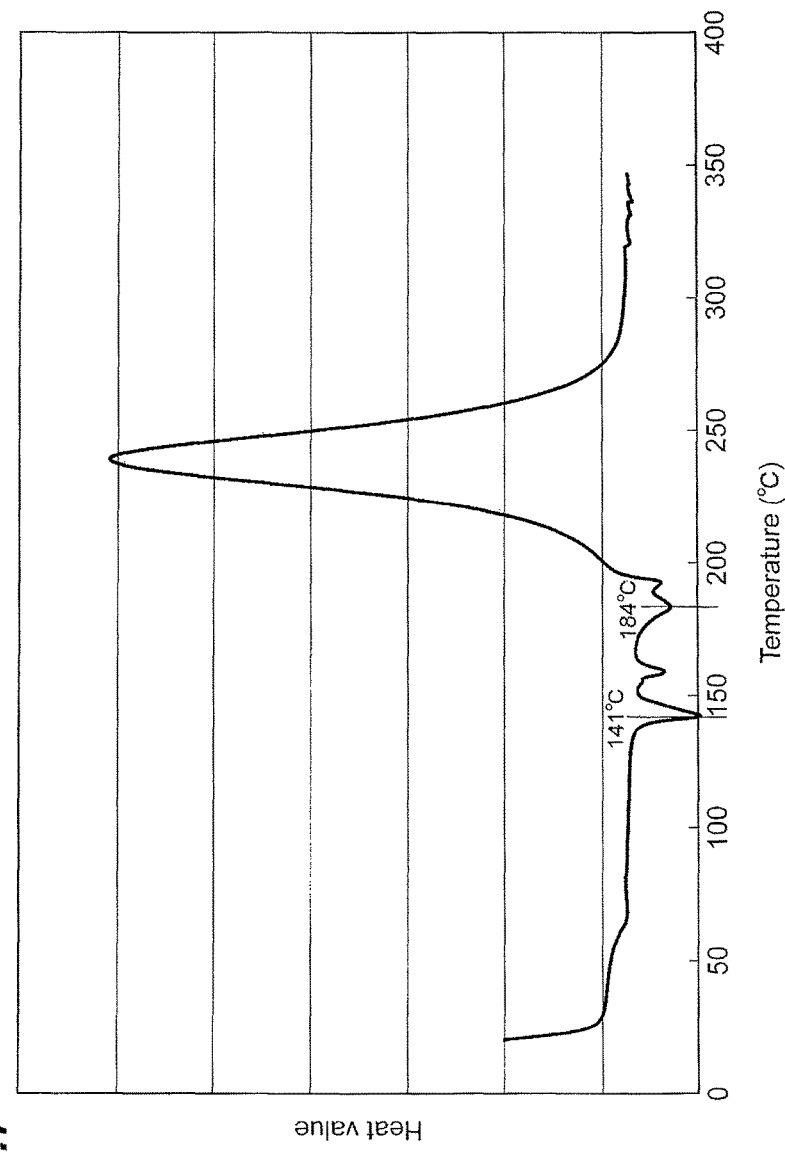
FIG. 7 is a DSC chart of a second resin composition of Example 7.
Figure 8:
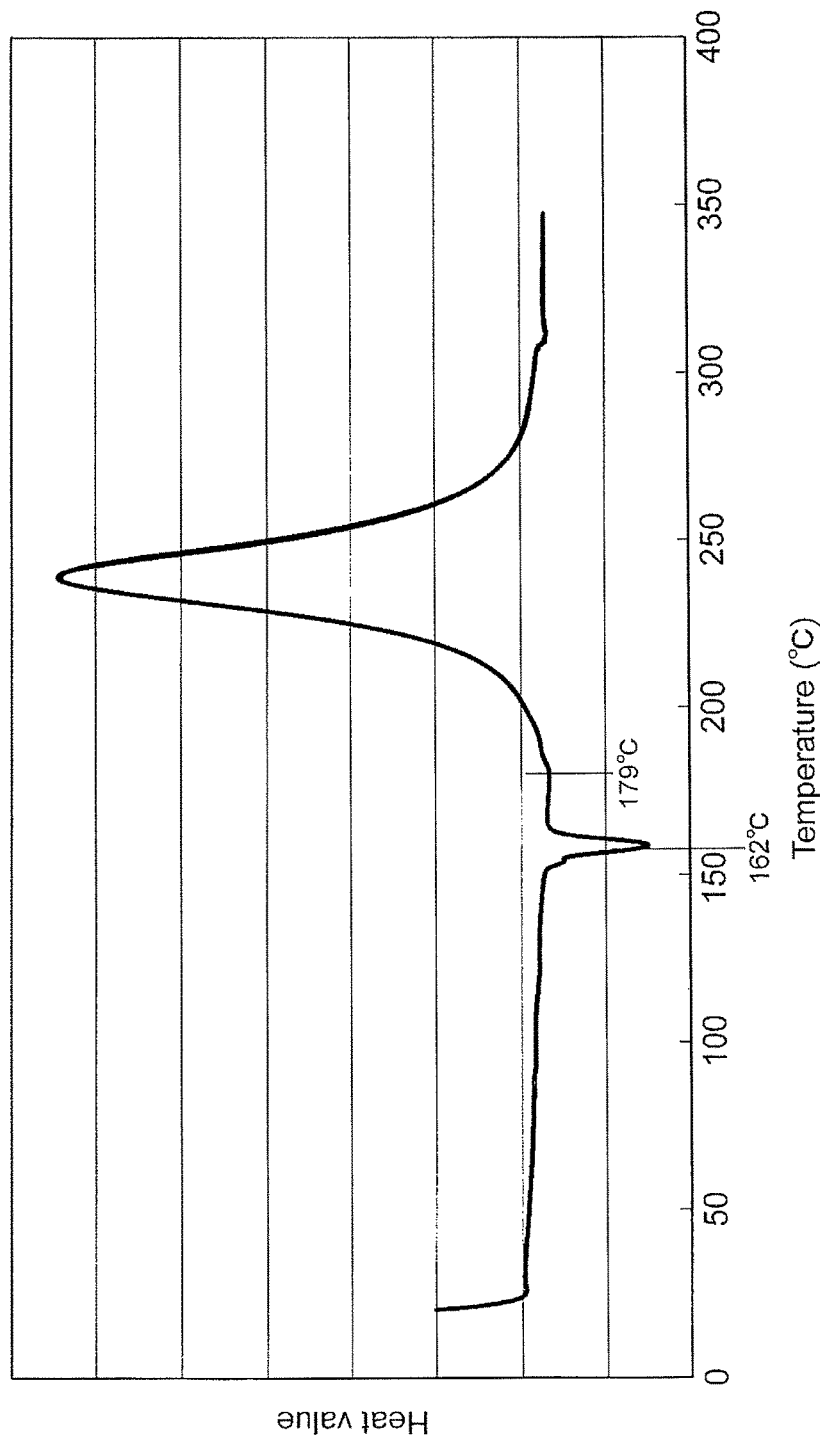
FIG. 8 is a DSC chart of a second resin composition of Example 13.
Figure 9:
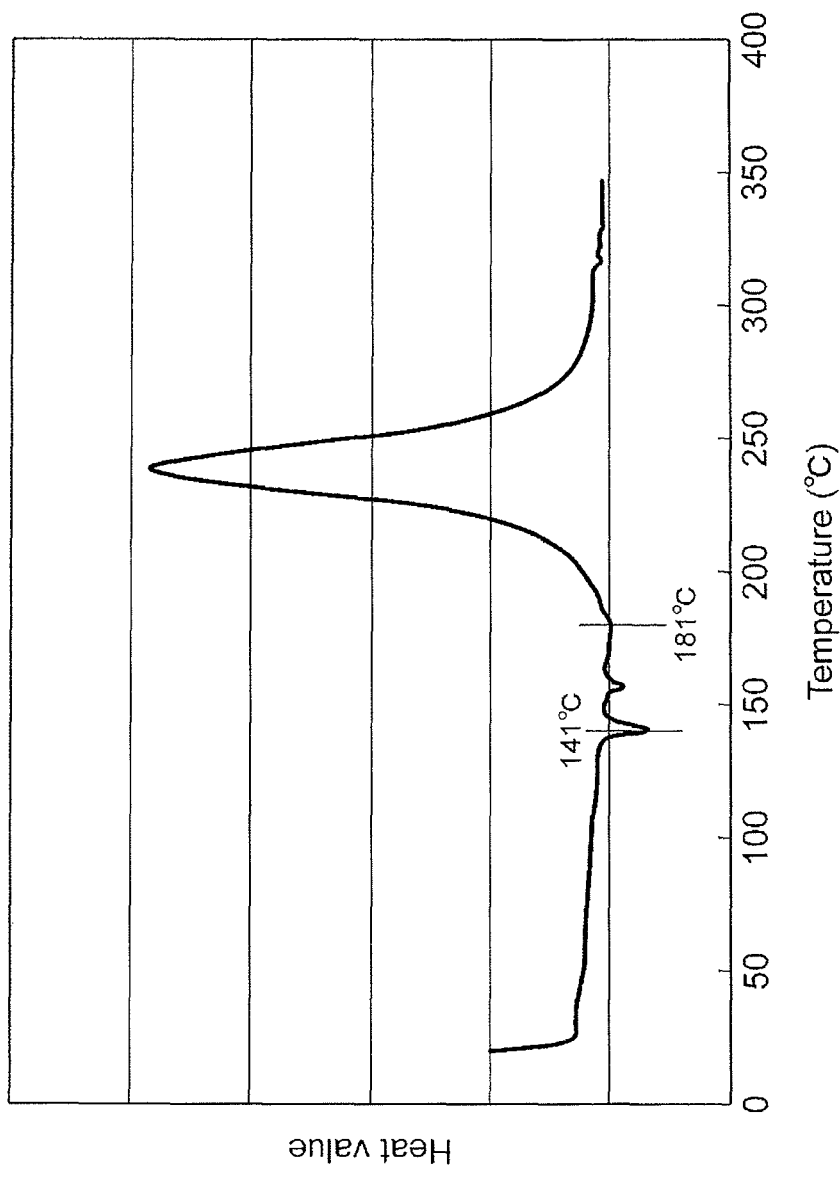
FIG. 9 is a DSC chart of a second resin composition of Example 20.

The second resin composition obtained was increased in temperature at a rate of 10° C./minute from 25° C. using a differential scanning calorimeter (DSC), and the temperature of the top of the resulting endothermic peak was taken as the melting temperature of the polyamide resin particles in the second resin composition. The results are shown in Tables 1 to 4. In an example in which two melting temperatures are listed in the column of melting temperature in Tables 1 to 4, the value in the upper side is the melting temperature of the (D1) component and the value in the lower side is the melting temperature of the (D2) component. As an example, a DSC chart of the second resin composition of Example 1 is shown in FIG. 6, a DSC chart of the second resin composition of Example 7 is shown in FIG. 7, a DSC chart of the second resin composition of Example 13 is shown in FIG. 8, and a DSC chart of the second resin composition of Example 20 is shown in FIG. 9.

<Measurement of the Glass Transition Temperature>

The second resin composition obtained was increased in temperature at a temperature increase rate of 2.0° C./minute from room temperature to 185° C. in an oven and cured for 2 hours at the same temperature to obtain a resin cured substance. For the cured substance obtained, the middle point temperature found on the basis of JIS K 7121 (1987) using a differential scanning calorimeter (DSC) was measured as the glass transition temperature. The results are shown in Tables 1 to 4.

<Measurement of the Flexural Modulus>

The second resin composition obtained was increased in temperature at a temperature increase rate of 2.0° C./minute from room temperature to 185° C. in an oven and cured for 2 hours at the same temperature to obtain a resin cured substance having a thickness of 2 mm. For the resin cured substance, the flexural modulus was measured in accordance with JIS J 7171. The results are shown in Tables 1 to 4.

<Measurement of the CAI>

Prepregs obtained were stacked 32 plies (layers) pseudo-isotropically with a configuration of [+45°/0°/−45°/90°]$_{4s}$, were increased in temperature in an autoclave at 2.0° C./minute from room temperature to 185° C. at a pressure of 0.6 MPa, and were then cured by heating for 2 hours at the same temperature; thus, a fiber-reinforced composite material was obtained. From the fiber-reinforced composite material, a sample of 150 mm long×100 mm broad was cut out in accordance with ASTM D7136 and D7137, and a falling weight impact of 6.7 J/mm was applied to a central portion of the sample; thus, the compressive strength after impact (CAI) was found. The results are shown in Tables 1 to 4.

<Mode I Interlaminar Fracture Toughness Test (G1c)>

Prepregs obtained were stacked 26 plies with each carbon fiber arranged so as to extend in the same direction, and a Kapton film (1 mil) (manufactured by DU PONT-TORAY CO., LTD.) was interposed in a partial region of the central interlayer (between the 13th layer and 14th layer) so as to introduce a precrack on the side surface of the stacked body perpendicular to the direction of the carbon fibers. Here, 1 mil means 1/1000 inches or 25.3995 μm. This was increased in temperature in an autoclave at a temperature increase rate of 2.0° C./minute from room temperature to 185° C. at a pressure of 0.6 MPa, and was then cured by heating for 2 hours at the same temperature; thus, a fiber-reinforced composite material was obtained. From the fiber-reinforced composite material, a sample of 264.0 mm long (fiber direction)×25.4 mm broad was cut out, and a hinge was bonded to each edge portion to obtain a test piece. This test piece was subjected to a double cantilever beam test at a loading speed of 1.0 mm/min in accordance with ASTM D5528 to find the mode I interlaminar fracture toughness value (G1c). The results are shown in Tables 1 to 4.

<Mode II Interlaminar Fracture Toughness Test (G2c)>

Prepregs obtained were stacked 26 plies with each carbon fiber arranged so as to extend in the same direction, and a Kapton film (1 mil) (manufactured by DU PONT-TORAY CO., LTD.) was interposed in a partial region of the central interlayer (between the 13th layer and 14th layer) so as to introduce a precrack on the side surface of the stacked body perpendicular to the direction of the carbon fibers. Here, 1 mil means 1/1000 inches or 25.3995 μm. This was increased in temperature in an autoclave at a temperature increase rate of 2.0° C./minute from room temperature to 185° C. at a pressure of 0.6 MPa, and was then cured by heating for 2 hours at the same temperature; thus, a fiber-reinforced composite material was obtained. From the fiber-reinforced composite material, a sample of 264.0 mm long (fiber direction)×25.4 mm broad was cut out to obtain a test piece. This test piece was subjected to an end-notched flexure test at a loading speed of 1.0 mm/min in accordance with Composite Materials Handbook 17-1 to find the mode II interlaminar fracture toughness value (G2c). The results are shown in Tables 1 to 4.

<The Abundance Ratio (volume %) of the Polyamide Resin Between Carbon Fiber Layers>

A cross section of the fiber-reinforced composite material taken along a plane orthogonal to the direction in which an arbitrary carbon fiber in the fiber-reinforced composite material obtained in the measurement of CAI extends was analyzed by microscopic observation (500 times), and image analysis was performed for a range of 500 μm×100 μm to observe the distribution of polyamide particles; thereby, the amount $C_1$ of the polyamide resin contained in one piece of the resin cured substance between carbon fiber layers and the amount $C_2$ of the polyamide resin contained in one carbon fiber layer were calculated. This measurement was performed on arbitrary 5 places that are combinations of different carbon fiber layers and different pieces of the resin cured substance, and the average value of the 5 places of $C_1$ and $C_2$ was used to find the volume proportion of $C_1$, $\{C_1/(C_1+C_2)\}\times 100$, per prepreg. The results are shown in Tables 1 to 4.

<Evaluation at Various Temperature Increase Rates>

For CAI, G1c, and G2c, evaluation was further performed in the same way as described above except that the temperature increase rate was changed to 0.3° C./minute. The results are shown in Tables 5 to 8 in combination with the evaluation results in the case of 2.0° C./minute.

TABLE 5

| | Evaluation | | | | | |
|---|---|---|---|---|---|---|
| | CAI (MPa) | | G1c (J/m$^2$) | | G2c (J/m$^2$) | |
| | Temperature increase rate (° C./minute) | | | | | |
| | 0.3 | 2.0 | 0.3 | 2.0 | 0.3 | 2.0 |
| Example 1 | 306 | 316 | 394 | 482 | 2209 | 2284 |
| Example 2 | 296 | 319 | 404 | 366 | 2296 | 2179 |
| Example 3 | 307 | 314 | 378 | 478 | 2157 | 2282 |
| Example 4 | 268 | 283 | 306 | 338 | 1900 | 1989 |
| Example 5 | 253 | 270 | 314 | 318 | 1826 | 1910 |
| Example 6 | 298 | 271 | 371 | 272 | 1663 | 2438 |
| Comparative Example 1 | 250 | 200 | 271 | 245 | 1650 | 1873 |
| Comparative Example 2 | 215 | 227 | 193 | 250 | 1560 | 1835 |

TABLE 6

| | Evaluation | | | | | |
|---|---|---|---|---|---|---|
| | CAI (MPa) | | G1c (J/m$^2$) | | G2c (J/m$^2$) | |
| | Temperature increase rate (° C./minute) | | | | | |
| | 0.3 | 2.0 | 0.3 | 2.0 | 0.3 | 2.0 |
| Example 7 | 278 | 220 | 281 | 244 | 2300 | 2088 |
| Example 8 | 265 | 210 | 275 | 241 | 2288 | 2006 |
| Example 9 | 298 | 235 | 311 | 285 | 2258 | 2132 |
| Example 10 | 288 | 229 | 288 | 244 | 2265 | 1980 |
| Example 11 | 294 | 255 | 309 | 251 | 2401 | 2273 |
| Comparative Example 3 | 215 | 227 | 193 | 250 | 1560 | 1835 |
| Comparative Example 4 | 280 | 175 | 211 | 140 | 2100 | 1651 |

TABLE 7

| | Evaluation | | | | | |
|---|---|---|---|---|---|---|
| | CAI (MPa) | | G1c (J/m$^2$) | | G2c (J/m$^2$) | |
| | Temperature increase rate (° C./minute) | | | | | |
| | 0.3 | 2.0 | 0.3 | 2.0 | 0.3 | 2.0 |
| Example 12 | 296 | 289 | 369 | 270 | 2998 | 2003 |
| Example 13 | 301 | 285 | 356 | 265 | 2885 | 2189 |
| Example 14 | 310 | 295 | 335 | 258 | 2777 | 2211 |
| Example 15 | 306 | 281 | 321 | 254 | 2668 | 2397 |
| Example 16 | 266 | 288 | 298 | 254 | 2581 | 2400 |
| Comparative Example 5 | 303 | 282 | 254 | 217 | 2363 | 2262 |
| Comparative Example 6 | 250 | 200 | 271 | 245 | 1650 | 1873 |

TABLE 8

| | Evaluation | | | | | |
|---|---|---|---|---|---|---|
| | CAI (MPa) | | G1c (J/m$^2$) | | G2c (J/m$^2$) | |
| | Temperature increase rate (° C./minute) | | | | | |
| | 0.3 | 2.0 | 0.3 | 2.0 | 0.3 | 2.0 |
| Example 17 | 306 | 291 | 246 | 232 | 2816 | 2300 |
| Example 18 | 300 | 289 | 271 | 227 | 2555 | 2264 |
| Example 19 | 300 | 289 | 266 | 221 | 2561 | 2195 |
| Example 20 | 310 | 296 | 243 | 207 | 2710 | 2290 |
| Example 21 | 317 | 281 | 255 | 219 | 2688 | 2285 |
| Comparative Example 5 | 303 | 282 | 254 | 217 | 2363 | 2262 |
| Comparative Example 4 | 280 | 175 | 211 | 140 | 2100 | 1651 |

As shown in Tables 1 to 4, it has been found that, in Examples 1 to 21 in which two types of the specific polyamide resin particles were used, G1c, G2c, CM, and flexural modulus can be achieved at a high level at the same time, and also the glass transition temperature of the resin material can be kept high.

Further as shown in Tables 5 to 8, in Examples 1 to 21 in which two types of the specific polyamide resin particles were used, CAI, G1c, and G2c can be obtained at a high level stably even in the case of different temperature increase conditions in heating a stacked body of prepregs. As a result of observation of cross-sectional photographs of the fiber composite materials of Examples 1 to 21 obtained under the respective conditions listed in Tables 5 to 8, a resin cured layer containing a polyamide resin between the fiber layers was confirmed to be formed in a sufficient thickness under any of the conditions. This suggests that the prepregs according to the present invention can provide a fiber-reinforced composite material which can deal with a wide range of production conditions and at the same time can achieve CAI, G1c, and G2c at a high level stably by the method according to the present invention.

INDUSTRIAL APPLICABILITY

As described above, according to the present invention, a production method for a fiber-reinforced composite material that makes it possible to obtain a fiber-reinforced composite material that, while using a benzoxazine resin having excellent moisture resistance and heat resistance, can achieve interlaminar fracture toughness, CAI, and flexural modulus at high level at the same time and can also keep the glass transition temperature of the resin material high, a prepreg and a resin composition containing particles which can be used for it, and a fiber-reinforced composite material can be provided. The fiber-reinforced composite material mentioned above can be used for aircraft uses, vessel uses, automobile uses, sports uses, and other general industrial uses.

REFERENCE SIGNS LIST

1 . . . reinforcing fibers, 2 . . . resin composition, 3 . . . reinforcing fiber layer, 4a . . . first polyamide resin particles, 4b . . . second polyamide resin particles, 5 . . . resin composition, 6a, 6b . . . surface layer, 7 . . . reinforcing fiber bundle, 8 . . . resin cured substance, 10, 11 . . . prepreg, 100 . . . fiber-reinforced composite material

The invention claimed is:

1. A production method for a fiber-reinforced composite material comprising:
stacking a prepreg plurally to obtain a prepreg-stacked body; and
heating the prepreg-stacked body to cure a resin,
wherein the prepreg comprises:
a reinforcing fiber layer including reinforcing fibers and a resin composition with which a space between fibers of the reinforcing fibers is impregnated and which contains (A) a benzoxazine resin, (B) an epoxy resin, and (C) a curing agent having 2 or more phenolic hydroxy groups in a molecule; and
a surface layer provided on at least one surface of the reinforcing fiber layer and containing (A) a benzoxazine resin, (B) an epoxy resin, (C) a curing agent having 2 or more phenolic hydroxy groups in a molecule, and (D) polyamide resin particles having an average particle size of 5 to 50 μm,
wherein the polyamide resin particles include (D1) first polyamide resin particles and (D2) second polyamide resin particles having a higher melting temperature measured in a composition constituting the surface layer than the melting temperature of the first polyamide resin particles
wherein a melting temperature of the (D1) first polyamide resin particles measured in the composition constituting the surface layer is 120 to 170° C.; and
a melting temperature of the (D2) second polyamide resin particles measured in the composition constituting the surface layer is 175 to 220° C.

2. The production method for a fiber-reinforced composite material according to claim 1,
wherein, when it is assumed that the melting temperature of the (D1) first polyamide resin particles measured in the composition constituting the surface layer is $M_1$° C. and
the melting temperature of the (D2) second polyamide resin particles measured in the composition constituting the surface layer is $M_2$° C.,
a value of ($M_2-M_1$) is 5 or more.

3. The production method for a fiber-reinforced composite material according to claim 1, wherein the surface layer contains 65 to 78 parts by mass of the (A) component, 22 to 35 parts by mass of the (B) component, 5 to 20 parts by mass of the (C) component, and 15 to 45 parts by mass of the (D) component when it is assumed that a total amount of the (A) component and the (B) component is 100 parts by mass.

4. The production method for a fiber-reinforced composite material according to claim 1, wherein the (D1) first polyamide resin particles are polyamide 12 resin particles and the (D2) second polyamide resin particles are polyamide 1010 resin particles.

5. A prepreg comprising:
a reinforcing fiber layer including reinforcing fibers and a resin composition with which a space between fibers of the reinforcing fibers is impregnated and which contains (A) a benzoxazine resin, (B) an epoxy resin, and (C) a curing agent having 2 or more phenolic hydroxy groups in a molecule; and
a surface layer provided on at least one surface of the reinforcing fiber layer and containing (A) a benzoxazine resin, (B) an epoxy resin, (C) a curing agent having 2 or more phenolic hydroxy groups in a molecule, and (D) polyamide resin particles having an average particle size of 5 to 50 μm,
wherein the polyamide resin particles include (D1) first polyamide resin particles and (D2) second polyamide resin particles having a higher melting temperature measured in a composition constituting the surface layer than the melting temperature of the first polyamide resin particles, wherein a melting temperature of the (D1) first polyamide resin particles measured in the composition constituting the surface layer is 120 to 170° C.; and a melting temperature of the (D2) second polyamide resin particles measured in the composition constituting the surface layer is 175 to 220° C.

6. The prepreg according to claim 5, wherein, when it is assumed that the melting temperature of the (D1) first polyamide resin particles measured in the composition constituting the surface layer is $M_1$° C. and the melting temperature of the (D2) second polyamide resin particles measured in the composition constituting the surface layer is $M_2$° C., a value of $(M_2-M_1)$ is 5 or more.

7. The prepreg according to claim 5, wherein the surface layer contains 65 to 78 parts by mass of the (A) component, 22 to 35 parts by mass of the (B) component, 5 to 20 parts by mass of the (C) component, and 15 to 45 parts by mass of the (D) component when it is assumed that a total amount of the (A) component and the (B) component is 100 parts by mass.

8. A fiber-reinforced composite material obtained by stacking the prepreg according to claim 5 plurally, forming a plurality of sequential reinforcing layers and surface layers, and performing heating under increased pressure.

9. The fiber-reinforced composite material according to claim 8, wherein the (D1) first polyamide resin particles are polyamide 12 resin particles and the (D2) second polyamide resin particles are polyamide 1010 resin particles.

10. The fiber-reinforced composite material according to claim 8, wherein the volume proportion $\{C_1/(C_1+C_2)\} \times 100$ is 70% by volume or more, wherein:

($C_1$) is the volume of polyamide resin contained between sequential reinforcing layers, and (C2) is volume of polyamide resin contained in the reinforcing layers.

11. The fiber-reinforced composite material according to claim 8, wherein the mode I interlaminar fracture toughness value (G1c) measured in accordance with ASTM D5528 is 300 J/m² or more.

12. The prepreg according to claim 5, wherein the (D1) first polyamide resin particles are polyamide 12 resin particles and the (D2) second polyamide resin particles are polyamide 1010 resin particles.

13. A resin composition containing particles, comprising:

(A) a benzoxazine resin;

(B) an epoxy resin;

(C) a curing agent having 2 or more phenolic hydroxy groups in a molecule; and (D) polyamide resin particles having an average particle size of 5 to 50 μm, wherein the polyamide resin particles include polyamide 12 resin particles and polyamide 1010 resin particles.

14. The resin composition containing particles according to claim 13, wherein the resin composition contains 65 to 78 parts by mass of the (A) component, 22 to 35 parts by mass of the (B) component, 5 to 20 parts by mass of the (C) component, and 15 to 45 parts by mass of the (D) component when it is assumed that a total amount of the (A) component and the (B) component is 100 parts by mass.

* * * * *